(12) United States Patent
Narumiya et al.

(10) Patent No.: US 6,217,928 B1
(45) Date of Patent: Apr. 17, 2001

(54) PROCESS OF FREEZING SUSHI, BOILED RICE OR PROCESSED FOOD WITH BOILED RICE AS MAIN COMPONENT

(75) Inventors: Tadaoki Narumiya; Noboru Mikawa, both of Tokyo (JP)

(73) Assignees: Mayekawa Mfg. Co., Ltd.; Am-Pm-Japan Co., Ltd., both of Tokyo (JP)

( * ) Notice: Subject to any disclaimer, the term of this patent is extended or adjusted under 35 U.S.C. 154(b) by 0 days.

(21) Appl. No.: 08/481,307

(22) PCT Filed: Nov. 1, 1994

(86) PCT No.: PCT/JP94/01842

§ 371 Date: Aug. 21, 1995

§ 102(e) Date: Aug. 21, 1995

(87) PCT Pub. No.: WO95/12324

PCT Pub. Date: May 11, 1995

(30) Foreign Application Priority Data

Nov. 2, 1993 (JP) .................................... 5-297308
Feb. 4, 1994 (JP) .................................... 6-033058

(51) Int. Cl.$^7$ ...................................... A23L 3/00
(52) U.S. Cl. ............................... 426/524; 62/63
(58) Field of Search ................... 426/524, 519; 62/63

(56) References Cited

U.S. PATENT DOCUMENTS 4,607,495 * 8/1986 Fujimoto et al. .................... 426/524

FOREIGN PATENT DOCUMENTS

| 051191 | 5/1982 | (EP) . |
|---|---|---|
| 56-151470 | 11/1981 | (JP) . |
| 57-005659 | 1/1982 | (JP) . |
| 58-158146 | 9/1983 | (JP) . |
| 63-094945 | 4/1988 | (JP) . |

* cited by examiner

Primary Examiner—George C. Yeung
(74) Attorney, Agent, or Firm—Evenson, McKeown, Edwards & Lenahan, P.L.L.C.

(57) ABSTRACT

A process of freezing sushi, boiled rice or processed food with boiled rice as the main component permits substantially the same quality offered before freezing to be obtained after natural thawing or thawing using an electric oven. When freezing nigiri-sushi at a normal temperature of about 20° C., the freezer temperature is first reduced from a preliminary cooling temperature of −10° C. to a temperature of −30° C. in about 20 min. with a temperature gradient of about 1 to 2° C./min. The freezer temperature is then reduced from −30 to −40° C. with a temperature gradient of 1° C./min. or below, preferably about 0.5° C./min., over a time of 15 to 25 min., and preferably 15 to 20 min., until a maximum ice generation temperature range of 0 to −10° C. for the rice part of the sushi, specifically −3 to −6° C., is passed.

35 Claims, 22 Drawing Sheets

(4 of 22 Drawing Sheet(s) Filed in Color)

F I G. 4
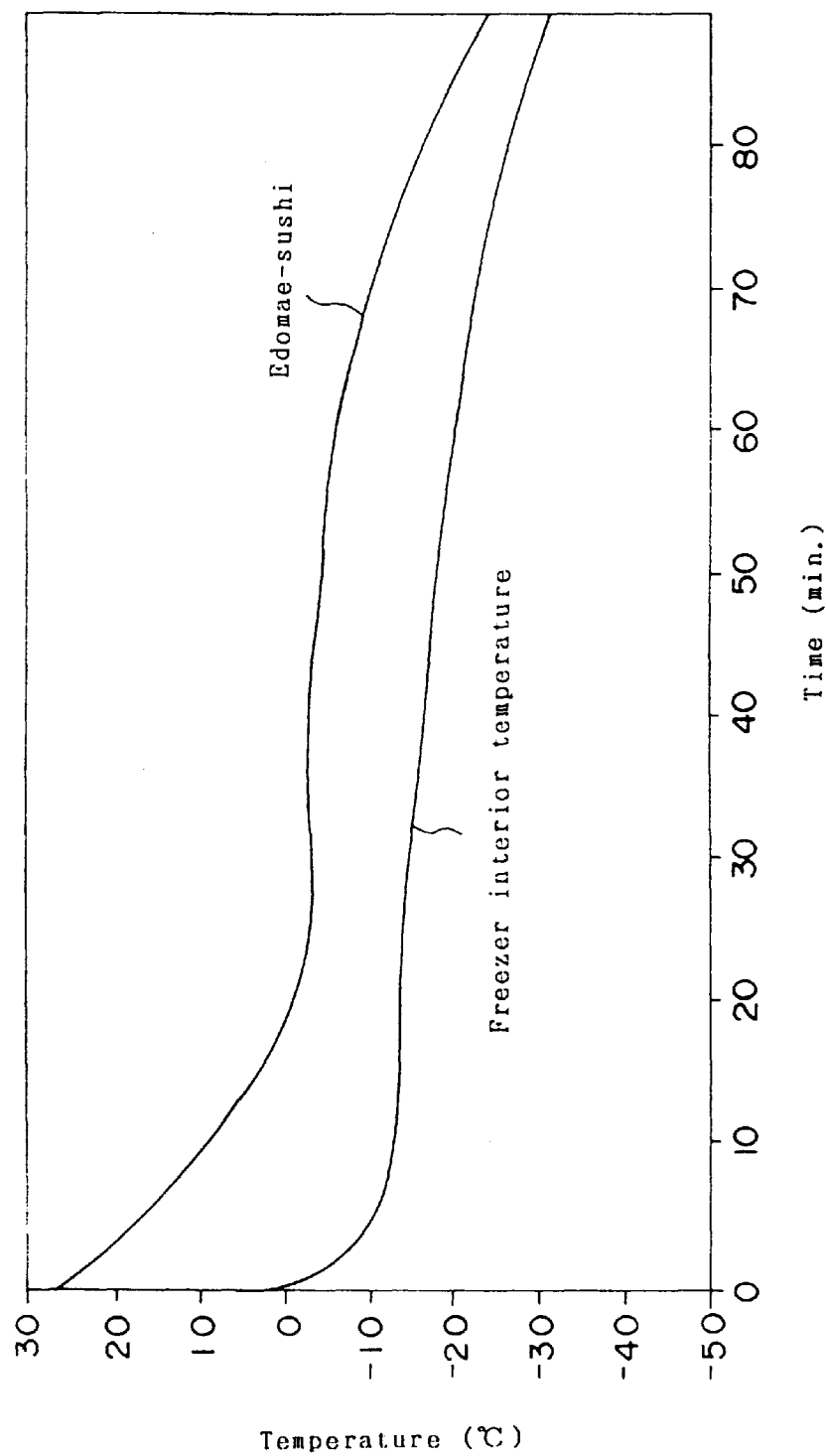

F I G . 7

Weighing cleaned rice···600g
|
Washing rice···(15 times left and right per about one liter
              of purified water) × 5 times
|
|―――――― Measuring water temperature
|―――――― Adding 840ml of purified water
|
Dipping···120 min.
|
|―――――― Measuring water temperature when dipping
|
Rice cooking with boiled···60 min. after turning on switch
|
|―――――― Measuring rice cooking finished temperature
|
Leaving to cool, cooling··· about 30℃
|
Packing···200g each, 7 packs in total
|
|      ⎛ ·as Physical property analysis sample: 2 packs ⎞
|      ⎜ ·as Water content measurement sample: 1 pack   ⎟
|      ⎜ ·as Taste testing sample: 1 pack               ⎟
|      ⎜ ·as Temperature curve data sample: 1 pack      ⎟
|      ⎜ ·as Cont. sample: 1 pack                       ⎟
|      ⎝ ·as Spare (less than 200g): 1 pack             ⎠
|
|―――――――――――――――――――――――――――――――――|
|                                                       |
Freezing···  ⎧ Quick freezing : 60 min. ⎫
             ⎨ Ideal freezing : 60 min. ⎬    〈Cont. sample(non-freezing)〉
             ⎩ Slow freezing  : 90 min. ⎭         |
|                                            Analyzing(texture, water con-
|                                                       tent rate)
Air purged packaging (packaging)
|
Preserving···−20〜−25℃, for one night
|
Thawing (normal temperature thawing)··· room temperature, 180〜240 min.
|
Analyzing (texure, water content rate)
|
Taste sensuous testing F I G. 1 1
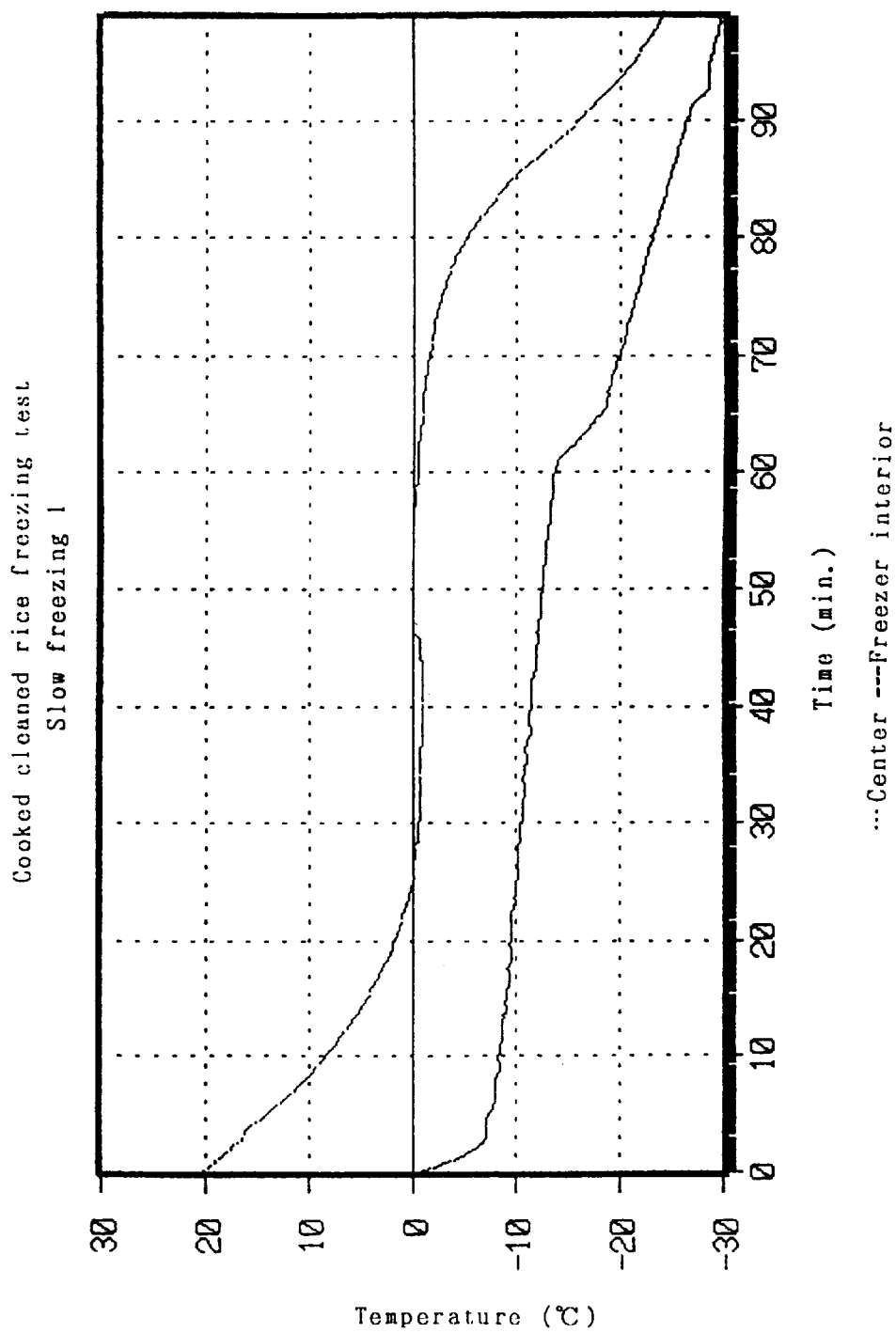

FIG.17

Results of taste sensuous tests

| Process | Sample(Oven) | Hardness | Stickiness | Taste | Whiteness | Remarks |
|---|---|---|---|---|---|---|
| Cont. | Common | 5 | 5 | 5 | 5 | Standard |
| Q (Quick freezing) | 1 | 2 | 2 | 3 | 3 | slightly hard |
|  | 2 | 3 | 3 | 3 | 3 |  |
|  | 3 | 2 | 2 | 3 | 2 |  |
|  | 4 | 3 | 2 | 3 | 2 |  |
|  | 5 | 2 | 2 | 3 | 3 | slightly less sticky hard |
|  | 6 | 3 | 1 | 2 | 3 | not sticky |
| S (Slow freezing) | 1 | 2 | 2 | 3 | 3 | hard and not sticky |
|  | 2 | 2 | 2 | 3 | 2 |  |
|  | 3 | 2 | 2 | 3 | 2 |  |
|  | 4 | 2 | 3 | 3 | 2 |  |
|  | 5 | 2 | 2 | 3 | 2 | slightly whitened |
|  | 6 | 3 | 2 | 2 | 3 | not sticky |
| B (Ideal freezing) | 1 | 3 | 3 | 4 | 4 |  |
|  | 2 | 3 | 4 | 3 | 3 |  |
|  | 3 | 3 | 3 | 4 | 3 |  |
|  | 4 | 4 | 3 | 3 | 4 |  |
|  | 5 | 5 | 5 | 4 | 5 | very good |
|  | 6 | 5 | 5 | 4 | 5 | very good |

(A)
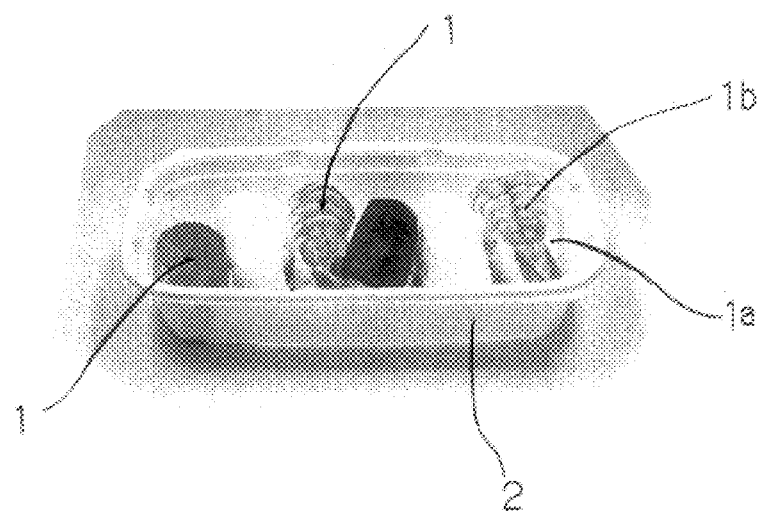
(B)
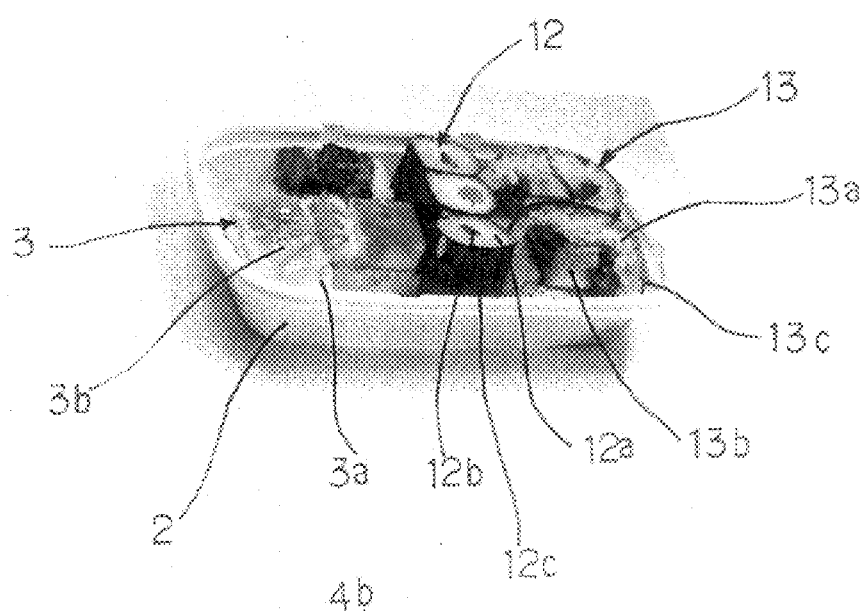
(C)
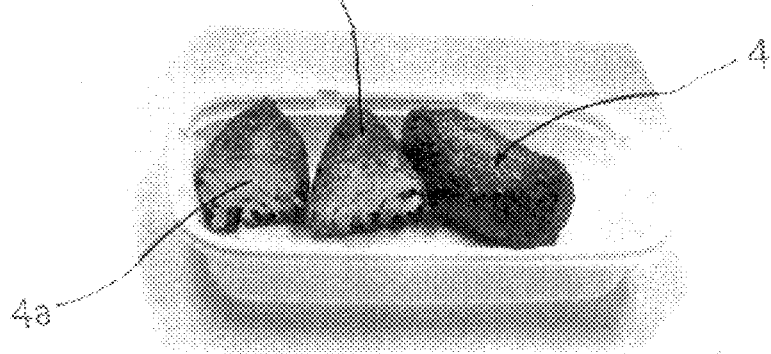
F I G. 1 9

(A)
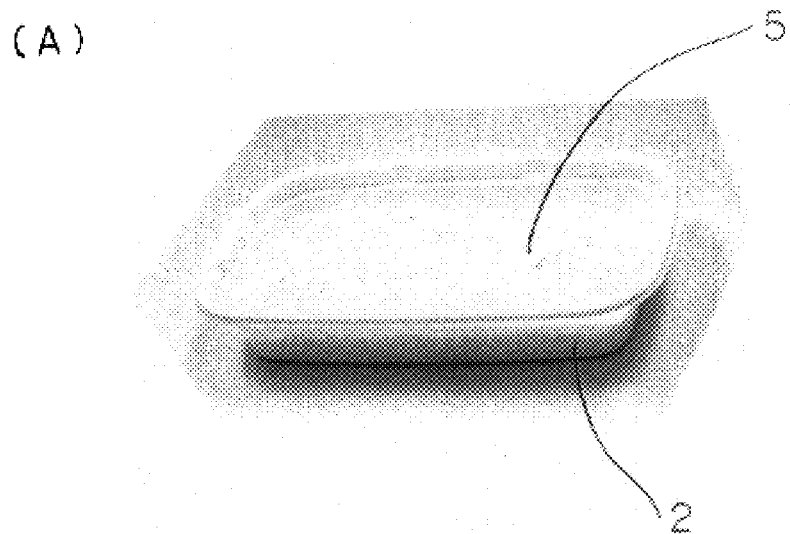
(B)
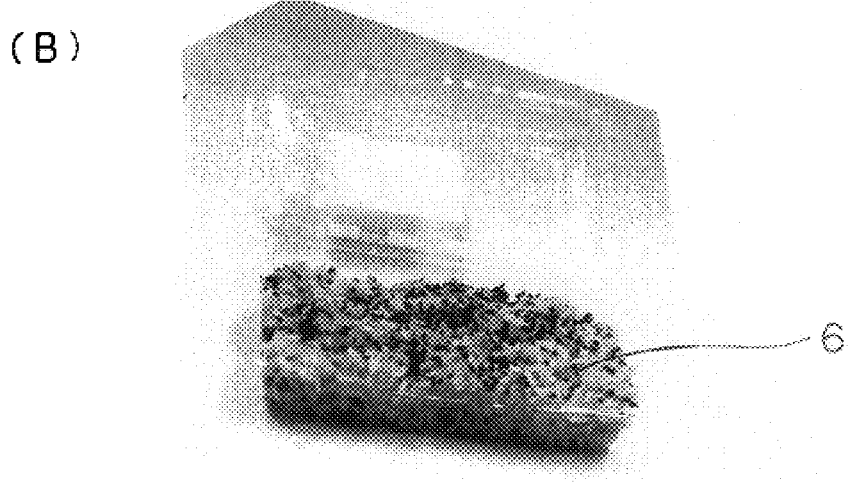
(C)
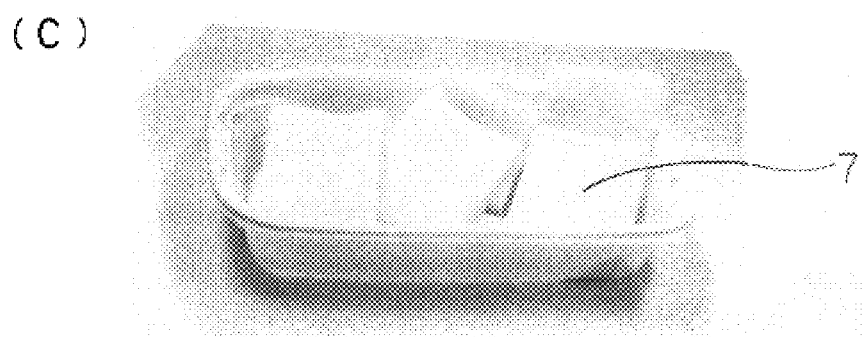
F I G . 2 0

(A)
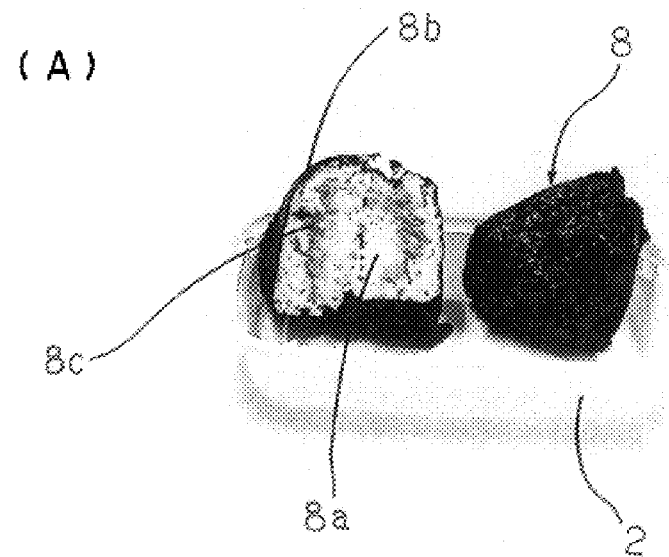
(B)
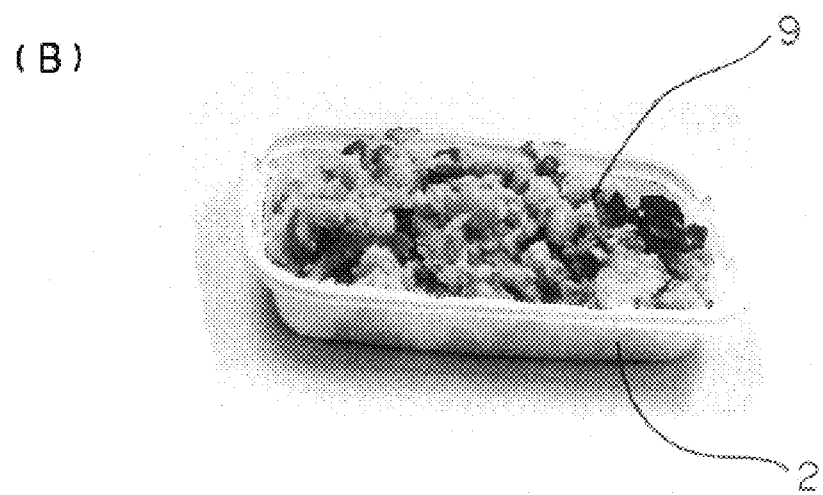
(C)
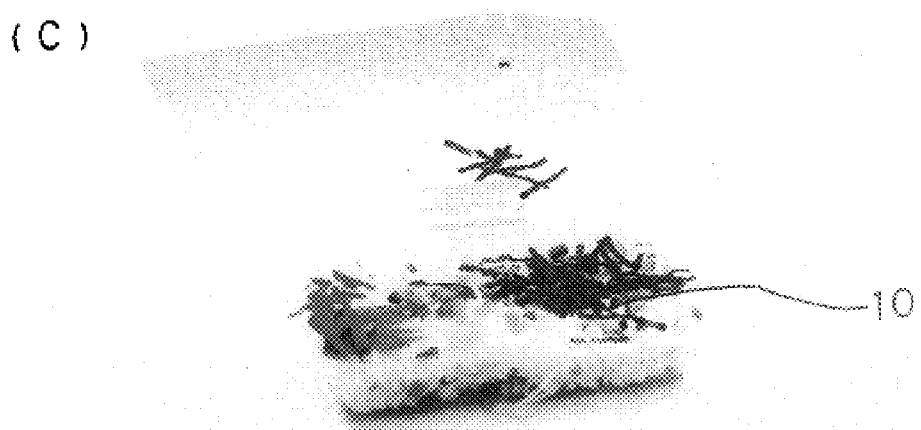
FIG 21

PROCESS OF FREEZING SUSHI, BOILED RICE OR PROCESSED FOOD WITH BOILED RICE AS MAIN COMPONENT

BACKGROUND OF THE INVENTION

1. Field of the Invention

This invention relates to a process of freezing sushi, boiled rice or processed food with boiled rice as the main component.

Among varieties of sushi which can be frozen by a process according to the invention is nigiri-sushi (or edomae-sushi) 1 as shown in FIG. 19(A). A piece of this food is prepared by forming an adequate amount of boiled rice 1a with vinegar into a mouthful-sized oval piece, putting a piece of fish, shellfish, shrimp, etc. 1b on this rice piece, and then adjusting the overall shape of the food by lightly gripping the same. Another variety of sushi is oshi-sushi 3 as shown in FIG. 19(B). This food is prepared by filling a rectangular wooden frame of about 20 cm×10 cm with boiled rice with vinegar 3a, putting a piece or pieces of fish, shellfish, shrimp, etc. 3b on the rice, pressing the resultant food from above with a wooden lid for shape adjustment, and then cutting the food into mouthful-sized pieces. A further variety of sushi is inari-sushi 4 as shown in FIG. 19(C). This food is prepared by using aburage (or fried sliced tofu) 4b prepared by frying rectangular sliced tofu in oil after water draining. Each aburage piece 4b is cut into two halves, and these aburage halves are boiled using sweet shoyu. Then, each boiled aburage half is opened from the cut side into a sack-like form, and then boiled rice 4a with vinegar is charged into the open boiled aburage half. In this way, a piece of inari-sushi is obtained. A further variety of sushi is maki-sushi or norimaki 12 as shown in FIG. 19(B). As shown, a piece of this food has a circular sectional profile. This variety may also include futomaki 13. This variety comprises a central ingredient part 12b, 13b which may be a piece or pieces of fish, baked egg, cucumber or like vegetables, etc., a boiled rice part 12a, 13a surrounding the ingredient part and having a predetermined thickness, and paper-like toasted layer 12c, 13c surrounding the boiled rice part. (The norimaki 12 and futomaki 13 are different in that in the norimaki 12 only a single kind of ingredient is used for the central ingredient part, while the futomaki 13 uses a plurality of different ingredients, the former being about 3 cm in diameter and the latter being about 5 cm.)

Particularly, the invention concerns a process of freezing sushi, which permits substantially the same quality as non-frozen sushi to be obtained after natural thawing.

Further, the invention is applicable to a process of freezing boiled rice or processed food, with boiled rice as a main component, permitting substantially the same quality as non-frozen food to be obtained after natural thawing. Among varieties of this type of food, there is boiled cleaned or uncleaned rice as shown in FIG. 20(A). The boiled cleaned rice 5 is prepared by boiling cleaned rice or white rice grains, which are obtained by polishing off surface portions of uncleaned rice after hulling. The boiled uncleaned rice is prepared by boiling uncleaned rice in a high pressure oven. A further variety of the food is sekihan 6 as shown in FIG. 20(B). This food is prepared by boiling or steaming glutinous rice with azuki bean, making the rice itself pink. A further variety of the food is rice cake 7 as shown in FIG. 20(C). This food is prepared by squeezing steamed glutinous rice into a grain-free state. A further variety of the food is onigiri 8 utilizing boiled rice as shown in FIG. 21(A). This food is a substantially triangular piece of boiled rice 8a formed with both hands or with a wooden frame. If desired, pickled fish egg, pickled plum, etc. may be provided inside. Further, onigiri may have a cover of a paper-like layer 8b. A further variety of the food is takikomi gohan (combination boiled rice) 9 as shown in FIG. 21(B). This is prepared by boiling rice together with sliced meat, vegetables, fish, shellfish, etc. and also with shoyu or like seasoning. A further variety is fried rice prepared by frying boiled rice with slices of meat, vegetables, fish, shellfish,. etc. A further variety of the food is okowa (combination steamed glutinous rice) similar to the takikomi gohan 9. This food is prepared by steaming glutinous rice together with meat, vegetables, fish, shellfish, etc. and also with shoyu or like seasoning. Sometimes, the materials are steamed while they are wrapped in bamboo bud skin. A further variety of the food is pilaf which is prepared by boiling rice together with meat, vegetables, fish, shellfish, etc. and also with olive oil, Safran or like seasoning. A further variety of the food is ohagi 11 as shown in FIG. 22(A). This food is a mouthful ball-like boiled glutinous rice piece 11a in sweet boiled azuki bean 11b. A further variety of the food is chirashi as shown in FIG. 21(C), which is prepared by mixing boiled rice with vinegar and sliced fish, baked egg, vegetables such as cucumber, etc. A further variety of the food is beaf bowl or other bowls, which is prepared by filling a bowl with rice and then putting cooked meat, egg, curry, etc. on the rice. There are further varieties of the processed food, the volume of which is mainly occupied by boiled rice, for instance curry rice.

2. Description of the Prior Art

Among recent frozen foods are fresh foods and cooked foods, and boiled rice, rice cake, sushi and the like are not exceptions. These conventional frozen foods, however, have their texture destroyed when they are frozen. Therefore, when they are thawed, a great deal of liquid is produced, giving rise to great differences of smoothness and sense of touch compared to fresh foods.

Particularly, frozen nigiri-sushi presents such problems as escapement of vinegar from the rice ball part, which is made from boiled rice with vinegar and carries a piece of fish or the like, hard rice grains due to loss of stickiness, discoloring of ingredients, loss of taste, etc.

Also, boiled rice or processed food with boiled rice as a main component, when frozen and thawed in the usual way, results in hard rice grains due to loss of stickiness and therefore in unsatisfactory taste, sense of eating, etc.

To solve the above problems, various processes of freezing sushi or boiled rice or the like have been proposed.

For example, Japanese Patent Laid-Open Publication No. Sho 61-260843 (Prior Art Example 1) shows a freezing process in which maki-sushi is frozen quickly in a state of being wrapped in transparent film to a temperature of −40 to −70° C.

Also, Japanese Patent Laid-Open Publication No. Hei 2-100643 (Prior Art Example 2) shows a method of manufacturing frozen sushi in which washed rice is boiled while adding vinegar to additive liquid for extraction of branched cyclodextrine for vinegar escapement prevention and organic phosphate, amino acid, etc. for preventing the hardening and oxidation of the rice to obtain boiled rice with vinegar. Sushi is then prepared with the boiled rice and ingredients, and the sushi thus prepared is frozen momentarily in contact with liquid nitrogen gas in a short period of time (i.e., 18 to 20 min.).

Further, Japanese Patent Laid-Open Publication No. Sho 5-38266 (Prior Art Example 3) shows a process of producing frozen boiled rice including frozen sushi, in which rice boiled in the usual way is cooled down to 25 to 40° C., formed to a predetermined shape, frozen quickly in a freezer preliminarily cooled down to −40 to −50° C. by blowing liquified gas against the rice while maintaining a constant reduced pressure in the freezer, and then frozen continually by passing a maximum ice generation temperature range in a short period of time (i.e., 3 min.), thus obtaining substantially the same temperature of the superficial and central parts of the formed rice.

Prior Art Example 1, however, is a special process of freezing maki-sushi and can not be applied to nigiri-sushi with a piece of fish, shellfish, cooked egg (hereinafter referred to as sushi raw materials) put on a riceball. Bedsides, the process requires wrapping each sushi piece, which is very cumbersome.

Prior Art Example 2 requires especially prepared additives or additive liquids for preventing escapement of vinegar from boiled rice with vinegar and the hardening and oxidation of the boiled rice. The tastes of such additives cause bitterness, leading to great deterioration of the taste.

In either of the above techniques, a significant problem is posed by the quick freezing sushi when passing the maximum ice generation temperature range (−1 to −5° C.) in a minimum period of time for texture destruction prevention in the freezing process. A freezing curve which is obtainable when quickly passing the maximum ice generation temperature range for quick freezing, for the rice ball part as shown in FIG. 3, does not always provide for good taste, and the quality of food is extremely deteriorated compared to non-frozen sushi.

A further problem which is posed in case of frozen sushi is that the technique of thawing is usually very difficult. This is because the sushi raw material part (e.g., fish piece) and rice ball part require different thawing times when using an electronic oven, for instance, for thawing. Therefore, setting the thawing time for the raw material results in most of the rice ball remaining in the frozen state. If the thawing time is set for the rice ball part, on the other hand, the sushi raw material is excessively heated by the heat of the electronic oven during the thawing of sushi.

Accordingly, a technique for high frequency heating sushi raw materials when wrapped in aluminum foil is disclosed in Japanese Patent Laid-Open No. Sho 63-24864. However, it is practically impossible to separate the sushi raw material part and rice ball part of the frozen sushi. Basically, therefore, a freezing technique which permits sushi obtained by natural thawing to have the same quality as non-frozen sushi is necessary.

It has been proposed to vacuum seal boiled cleaned rice or the like and water in a resin film bag for steaming under pressure and subsequent freezing and thawing; this is disclosed in Japanese Patent Laid-Open Publication No. Sho 60-16560. Such a freezing process, in which rice is steamed under pressure when packed with water, is not applicable to onigiri or like processed food.

Further, what is commonly called a loose rice freezing process, in which boiled rice is frozen in a loose state such that the individual grains are distinct from one another, is disclosed in, for instance, Japanese Patent Laid-Open Publication No. Sho 62-253350. Such a freezing process provides for rice with individual grains distinct from one another due to lack of stickiness. Such rice, although suitable as the material of pilaf, is unsuited for eating directly after thawing. Further, the rice cannot be sold directly after thawing as a product in shops.

Further, a technique of freezing rice that has been boiled with an organic acid or a derivative thereof is disclosed in Japanese Patent Laid-Open No. Sho 60-172262. According to such a technique, the taste is deteriorated by the additive.

SUMMARY OF THE INVENTION

An object of the invention, in view of the above technical problems, is to provide a process of freezing sushi which permits frozen sushi to have substantially the same taste and sense of eating as non-frozen sushi.

Another object of the invention is to provide a process of freezing sushi which permits frozen sushi to have substantially the same taste and sense of eating as non-frozen sushi even after natural thawing.

A further object of the invention is to provide a process of freezing sushi which permits frozen sushi to have substantially the same taste and sense of eating as non-frozen sushi even when individual sushi pieces are frozen without being wrapped one by one but rather while being held in rows in vessels.

A still further object of the invention is to provide a process of freezing boiled rice, such as boiled cleaned rice, boiled uncleaned rice, sekihan rice or rice cake, or processed food utilizing such boiled rice, such as onigiri, combination boiled rice, fried rice, chirashi, ohagi or okowa, which permits the same quality as that before freezing to be obtained after thawing.

A yet further object of the invention is to provide a process of freezing boiled rice obtained in the usual way and/or processed food utilizing such boiled rice, which permits the same taste and sense of eating as before freezing to be obtained after thawing even when the food is frozen and naturally thawed in a packed state or while held in plastic vessels or the like.

Still another object of the invention is to provide a process of freezing boiled rice obtained in the usual way and/or processed food utilizing such boiled rice, without the use of any additive, which permits substantially the same taste and sense of eating before freezing to be obtained after freezing and natural thawing.

Yet another object of the invention is to provide a process of freezing sushi, boiled rice or processed food with boiled rice as main component, which permits the manufacturer to obtain food with good reproducibility and also permits the consumer to obtain good taste and substantially the same quality as fresh processed food before freezing.

To attain the above objects of the invention, there is provided a process of freezing sushi, such as nigiri-sushi, inari-sushi, maki-sushi, etc., which comprises disposing the sushi, while being held alone or mixed in vessels, in a freezer, and then starting freezing. Freezing includes a first freezing step of reducing the temperature of the rice ball part of the sushi from the initial temperature at the start of freezing to the freezing point (0 to −4° C.), a second freezing step of reducing the temperature until passing of a maximum ice generation temperature range from the freezing point to about −10° C. while maintaining the same range for a predetermined period of time, and a third freezing step of reducing the temperature to −15° C. or below, preferably −20° C. or below, more preferably −30° C. or below, after passing of the maximum ice generation temperature range. The temperature gradient in the first freezing step is set to be greater than the temperature gradient in the second freezing step, and the time of the second freezing step is set to be longer than the time of the first freezing step. More specifically, at least the time of the second freezing step is set to about 15 to 35 min.

In this case, the freezing end temperature in the third freezing step may be −30° C. or below purely from the quality standpoint and may be −15° C. or below without any problem. Because of the need to increase the temperature of the product in a packing step subsequent to the end of freezing, it is suitable to end freezing with the product at a temperature of −20 to −30° C.

Further, the temperature gradient in the third freezing step, after passing through the maximum ice generation temperature range and until reaching −20 to −30° C., is suitably set to be substantially equal to or greater than the temperature gradient in the first freezing step.

Specifically, when freezing sushi at normal temperature, i.e., around 20° C., it is suitable to set the temperature gradient in the first freezing step to about 1 to 2.5° C./min., preferably about 1 to 2° C./min., the temperature gradient in the second freezing step to about 0.5° C./min. or below, preferably 0.3° C./min. or below, and the temperature gradient in the third freezing step to about 1 to 3° C./min., preferably 1.5 to 2.5° C./min.

If the freezing time in the third freezing step down to −20 to −30° C. after passing of the maximum ice generation temperature range is too short, then the intended effect can not be attained. Accordingly, when executing the third freezing step down to −30° C., it is suitable to set the time of this step to about 10 min. or above, preferably 10 to 20 min.

The freezer temperature, i.e., the temperature of the freezing space, will now be described on the basis of the freezing curve. When, for instance, nigiri-sushi, maki-sushi, etc., is disposed in a freezer such that pieces of sushi are held without each being wrapped in rows in vessels and then the freezer is initially cooled to a temperature of about 0 to −15° C., and preferably about −5 to −10° C., the freezing comprises a first freezer temperature reduction step of reducing the freezer temperature from the preliminary cooling temperature to about −30° C. in about 5 to 25 min. from the start of freezing, and a second freezer temperature reduction step of reducing the freezer temperature to a lower temperature. In this case, the temperature gradient in the first freezer temperature reduction step is set greater than the temperature gradient in the second freezer temperature reduction step, and the time until passing of the maximum ice generation temperature range of 0 to −10° C. of the rice part of the sushi is set to 15 to 35 min., preferably 15 to 25 min.

In this case, it is suitable to set the temperature gradient and time of the first freezer temperature reduction step to about 1 to 3° C./min., preferably 1 to 2° C./min., and about 10 to 20 min., respectively, and to set the temperature gradient in the second freezer temperature reduction step to 1° C./min. or below, preferably about 2.0 to 0.5° C./min.

It is to be understood that, in the foregoing description, the temperatures that are set for the first to third freezing steps refer to the temperature of the rice ball part, particularly the central part thereof, while those for the first and second freezer temperature reduction steps refer to the freezer temperature.

When freezing nigiri- or maki-sushi, the freezer is initially cooled down to the above temperature, and then the sushi is disposed while being held in rows in vessels in the freezer for freezing. The freezing in this case comprises a first freezer temperature reduction step of reducing the freezer temperature from the preliminary cooling temperature to about −30° C. in about 15 to 25 min., and a second freezer temperature reduction step of reducing the freezer temperature to a lower temperature. It is suitable in this case to set the temperature gradient in the first freezer temperature reduction step to be greater than the temperature gradient in the second freezer temperature reduction step and set the time until passing (or of maintenance) of the maximum ice generation temperature range of 0 to −10° C., more specifically −3 to −6° C., to 15 to 25 min., preferably 15 to 20 min.

The temperature gradient will now be described. When freezing nigiri- sushi at normal temperature, i.e., about 20° C., it is suitable to set the temperature gradient in and time of the first freezer temperature reduction step from the preliminary cooling temperature of −10° C. to −30° C. to 1 to 2° C./min. and about 20 min., respectively, and set the temperature gradient of the second freezer temperature reduction step down to −30 to −40° C. or below to 1° C./min. or below, preferably about 0.5° C./min.

A freezing curve of the rice part of nigiri-sushi is set such that the temperature gradient in the first freezer temperature reduction step is about 2° C./min., the temperature gradient in the second freezer temperature reduction step is about 0.5 to 0.3° C./min. or below, and the temperature gradient of the third freezing step down to −30° C. is about 2° C./min. or below.

With inari-sushi which, unlike nigiri-sushi, has its rice ball enclosed in aburage (or fried sliced tofu) impregnated with boiling juice, the freezing curve is set differently. Specifically, freezing is started after initially cooling the freezer and then disposing the sushi while being held in rows in vessels in the freezer. Freezing comprises a first freezer temperature reduction step of reducing the freezer temperature from the preliminary cooling temperature to about −30° C. in about 5 to 15 min. with a temperature gradient of about 2° C./min., and a second freezer temperature reduction step of reducing the temperature to −45° C. with a temperature gradient of −0.2 to −0.5° C./min.

Thus, the freezing curve that is set for the inari-sushi is such that the temperature gradient in and time of the first freezing step are about 1.2 to 1.5° C./min. and 10 to 20 min., respectively, the temperature gradient in and time of the second freezing step until passing of the maximum ice generation temperature range are about 0.3° C./min. or below and about 20 to 35 min., respectively, and the temperature gradient in the third freezing step down to −30° C. is about 2° C./min.

Experiment results prove that even when the food which has been frozen in such a way is thawed under the worst condition of natural thawing, it is possible to minimize vinegar escapement from boiled rice and changes in the hardness or stickiness. In addition, as for the sushi raw materials such as fish pieces, it is possible to obtain the same character as non-frozen sushi after thawing.

Further, when the vessel top, i.e., top of sushi raw materials, is open, it is suitable to freeze the food in a commonly termed slight air supply space with a minimum of air supplied into the freezer.

Further, a batch freezer or a continuous freezer such as a net conveyor, a movable truck or the like may be used as the freezer.

Aside from sushi, boiled rice or processed food with boiled rice as its main component, for instance onigiri, may be frozen in a similar process.

More specifically, boiled rice or the like is disposed in a non-packed or packed state in a freezer, and then freezing is started. The freezing in this case comprises a first freezing step of reducing the temperature of the food from the initial temperature thereof to the freezing point (0 to −4° C.), a second freezing step of maintaining a commonly termed maximum ice generation temperature range from the freezing point to –5 to –10° C., and a third freezing step of reducing the temperature to –20° C. or below, preferably –30 C or below, after passing through the maximum ice generation temperature range. The temperature gradient in the first freezing step is set to be greater than the temperature gradient in the second freezing step, and the time until passing of the maximum ice generation temperature range of 0 to –10° C. of the rice part is set to 15 to 35 min., preferably 15 to 30 min., and more preferably 20 to 30 min.

In a specific case of freezing the food at normal temperature, i.e., about 20° C., it is suitable to provide the first freezing step with a temperature gradient of 1.5 to 2.5° C./min., preferably 2° C./min., for 15 to 25 min., preferably about 20 min., provide the second freezing step with a temperature gradient of about 0.5° C./min. or below, preferably 0.3° C./min. or below, to maintain the maximum ice generation temperature range for about 23 to 37 min., preferably about 30±3 min., and provide the third freezing step down to –30° C. with a temperature gradient of about 1 to 2.5° C./min., preferably 1.5 to 2° C./min.

Again, in this case, if the freezing time of the third freezing step, after passing through the maximum ice generation temperature range and until reaching –30° C., is too short, the intended effect can not be attained. Accordingly, it is suitable to set the time to about 10 min. or above, preferably 10 to 20 min.

The freezer temperature will now be described on the basis of the freezing curve. A case of freezing boiled rice or the like is considered. In this case, the food is disposed, in a state held in vessels without or after packing, in a freezer, and the freezer is then initially cooled down suitably to about 0 to –10° C., preferably about –5° C. Freezing is then started, and it suitably comprises a first freezer temperature reduction step of reducing the freezer temperature to about –10 to –20° C., preferably about –15° C., in about 10 to 20 min. with a temperature gradient of about 1 to 3° C./min., preferably 1 to 2° C./min., a second freezer temperature reduction step or temperature maintaining step of maintaining a temperature range of about –10 to –20° C., and a third freezer temperature reduction step of reducing the temperature from the temperature in the temperature maintaining step to –30 to –45° C. with a substantially linear temperature gradient of 0.5 to 1.5° C./min., preferably 0.5 to 1° C./min, the freezing time of the second step being set to 10 to 23 min., preferably 10 to 20 min., and more preferably 15 min.

For such stringent temperature control, a batch freezer is suitably used as the freezer. However, it is possible as well to use a net conveyor or other continuous freezers, such as those of the truck type. In this case, step wise temperature control is possible by using a continuous freezer with partitioned spaces or rooms on the conveyor belt.

When using a continuous freezer with a belt or net conveyor, along which vessels holding food are moved, it is suitable to initially cool the freezer down to about –10° C. and set a freezer temperature reduction step of reducing the temperature from about –10° C. down to –40° C. with a substantially linear temperature gradient of 0.5° C./min.

A suitable freezing curve for boiled rice or the like was formed in this case such that the temperature of the food was reduced from a normal temperature of 23° C. to a maximum ice generation temperature range of the neighborhood of 0 to –3° C. in an initial period of about 20 min. with a temperature gradient of about 1 to 2° C./min., the maximum ice generation temperature range was passed in a subsequent period of about 29 to 38 min. with a slight temperature gradient of 0.3° C./min. or below, preferably about 0.2° C./min., and the temperature was then reduced to about –28° C. in a subsequent period of about 30 to 35 min. with a temperature gradient of about 0.5 to 1° C./min., preferably 0.7° C./min.

Experiment results prove that even when using this technique it is possible to obtain boiled rice with substantially the same quality of hardness, stickiness and taste after thawing under the worst condition of natural thawing as boiled rice before freezing.

Further, as described before, when the top of the vessel holding the boiled rice or the like is open, it is suitable to freeze the food in what is commonly called a slight air supply space with air supplied at a minimum rate into the freezer.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 4 is a diagram showing a freezing characteristic of nigiri-sushi in Comparative Example 2 of a process of slow freezing;

FIG. 7 is a flow chart showing a sequence of freezing of boiled rice held in a vessel in an example of the process according to the invention;

FIG. 11 is a diagram showing a freezing characteristic of boiled rice held in a vessel in a comparative example of slow freezing based on the flow shown in FIG. 7;

FIG. 17 is a table showing results of taste testing of boiled rice samples shown in FIGS. 8 to 13 in examples and Comparative Examples 1 and 2;

FIGS. 19(A)–(C) are photographs showing various sushi to be frozen, with FIG. 19(A) showing nigiri-sushi, FIG. 19(B) showing oshi-sushi, norimaki and futomaki, and FIG. 19(C) showing inari-sushi.

FIGS. 20 to 22 are photographs showing boiled cleaned rice or processed food with boiled rice as the main component, with FIG. 20(A) showing boiled cleaned rice, FIG. 20(B) showing sekihan, FIG. 20(C) showing rice cake, FIG. 21(A) showing onigiri, FIG. 21(B) showing takikomi-gohan, FIG. 21(C) showing chirashi, and FIG. 22(A) showing ohagi.

DETAILED DESCRIPTION OF THE PREFERRED EMBODIMENTS

Preferred embodiments of the invention will now be described as examples with reference to the accompanying drawings. It is to be construed that, unless otherwise specified, the temperature reduction conditions, freezing curves, materials, shapes and relative dispositions of the food to be frozen and so forth described hereinunder are mere examples.

First, 1 wt. part of cleaned rice was boiled with 1.4 wt. parts of cleaned water in a commercially available electric oven. Then, when the rice was cooled down to 40° C., vinegar for boiled rice with vinegar (composed of brewed vinegar, sugar, edible salt, seasonings and amino acid, specifically vinegar for sushi sold by Cupie Shokuhin) was added in an amount of about 10% of the boiled rice, and the resultant system was agitated to prepare boiled rice with vinegar at about 25° C.

Figure 6:
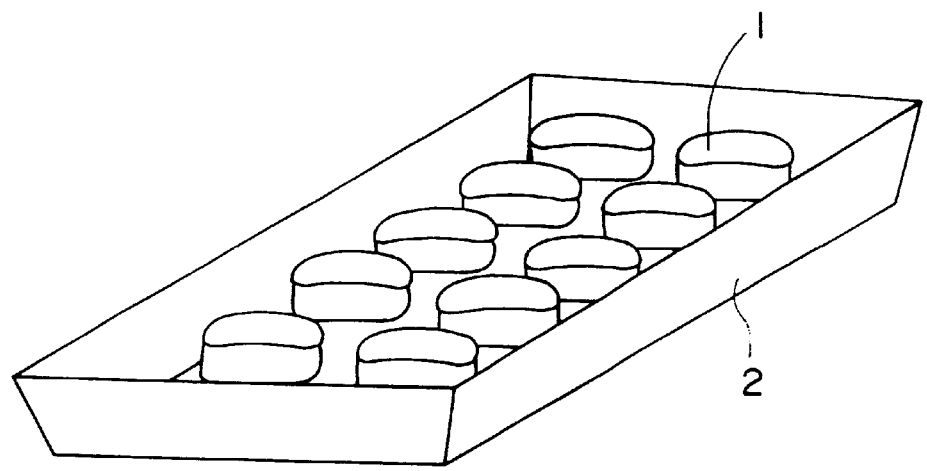
FIG. 6 is a perspective view showing a plastic vessel for holding sushi used in an example of the process according to the invention.

Then, using this boiled rice with vinegar, nigiri-sushi with ingredients put on rice balls, futomaki and inari-sushi, as shown in FIG. 19, were prepared using well-known sushi-preparing robots at normal temperature. These sushi varieties were each put in a well-known vessel 2 as shown in FIG. 6, made of a packing material of polyethylene, polypropyrene, etc., and open at the top. These vessels holding the sushi were then put on a second and a third shelf of an exclusive food freezing unit (i.e., a batch type air-cooled freezer provided under a trade name "High Power 22" by Maekawa Seisakusho), and then freezing was performed with freezing curves as shown in FIGS. 1 to 4.

The batch type freezer "High Power 22" is constructed such that air flows slightly through the inside and it has five shelves disposed one above another.

Figure 1:
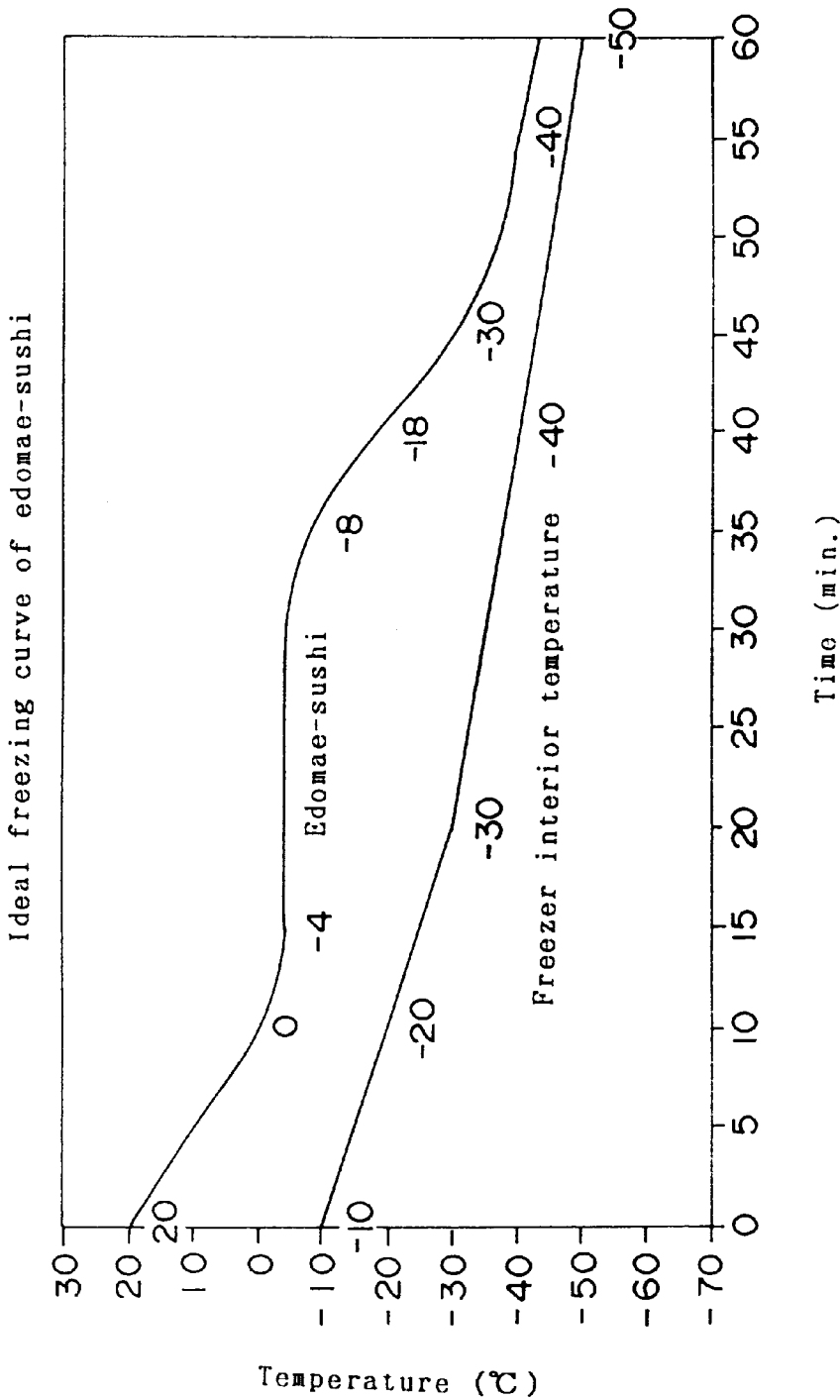
FIG. 1 is a diagram showing a freezing characteristic of nigiri-sushi and futomaki in an example of the process according to the invention.

FIG. 1 shows a freezing characteristic obtained in Example 1 of the process according to the invention with 10 pieces of sushi, i.e., either nigiri-sushi alone or nigiri-sushi and futomaki. As shown in the Figure, the freezer was preliminarily cooled down to about –10° C. Then, freezing was started to reduce the temperature to –30° C. in 20 min. with a temperature gradient of 1° C./min., and then the temperature was reduced continually to about –45° C. in 40 min. with a linear downward temperature gradient of 0.5° C./min. With this control characteristic A, a freezing curve of the temperature of the rice ball part of the sushi was produced such that the temperature was reduced from a normal temperature, i.e., 20° C., to a maximum ice generation temperature range in the neighborhood of –1 to –5° C. in an initial period of about 10 to 15 min. from the start of freezing with a temperature gradient of about 1° C./min. The temperature was then held in the maximum ice generation temperature range for a subsequent period of about 25 min., then reduced to –30° C. in a subsequent period of about 10 min. with a temperature gradient of 2.2° C./min. and then reduced to about –42° C. in a subsequent period of 15 min. with a temperature gradient of about –1° C./min.

On the basis of the above freezing characteristic, 20 batches of nigiri-sushi, prepared with fish, cuttlefish or shrimp, 20 batches of futomaki and 20 batches of mixed futomaki and nigiri-sushi were frozen repeatedly.

In Example 2, a permanent preservation process at –20° C. for 24 hr. was provided after the freezing process. In Example 3, alkali water was used instead of water, and 20 batches of nigiri-sushi 1 were frozen repeatedly.

Figure 2:
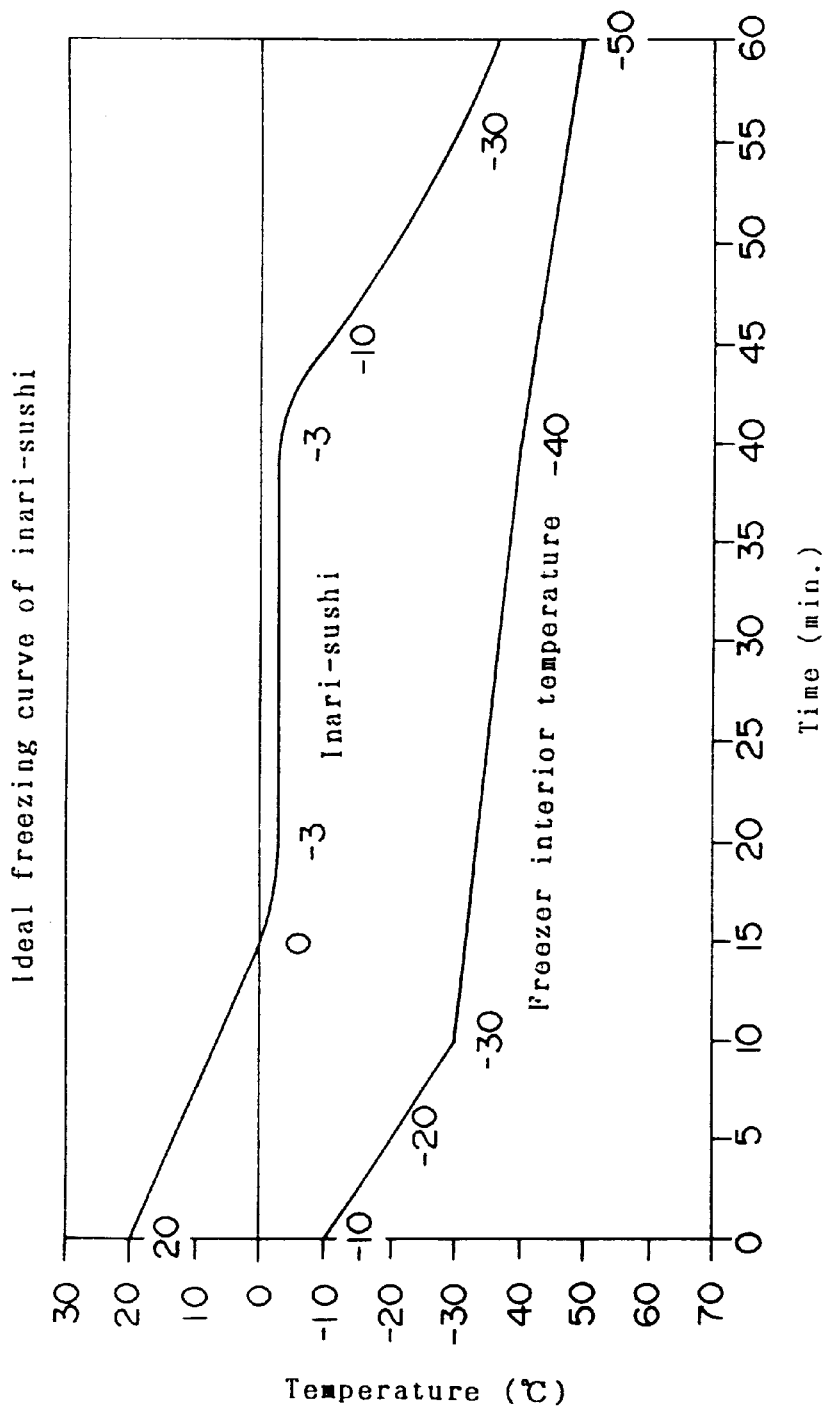
FIG. 2 is a diagram showing a freezing characteristic of inari-sushi in an example of the process according to the invention.

FIG. 2 shows a freezing characteristic of inari-sushi in Example 1 of the process according to the invention. As shown in this Figure, the freezer was initially cooled down to about –10° C., and then freezing of sushi was caused and the temperature reduced down to –30° C. in 10 min. from the start with a temperature gradient of 2° C./min. The temperature was then reduced down to about –50° C. in a subsequent period of 50 min. with a linearly downward temperature gradient of 0.3° C./min. With the above control characteristic B, a freezing curve of the temperature of inari-sushi was produced such that the temperature was reduced from normal temperature, i.e., 20° C., to reach the maximum ice generation temperature range in the neighborhood of –1 to –5° C. in an initial period of about 15 to 20 min. from the start of freezing with a temperature gradient of about 1.3° C./min. The temperature was then held in the maximum ice generation temperature range for a subsequent period of about 30 min. and then reduced to about –35° C. in a subsequent period of 15 to 20 min. with a temperature gradient of 2° C./min. Again this experiment was carried out repeatedly for 20 batches.

Figure 3:
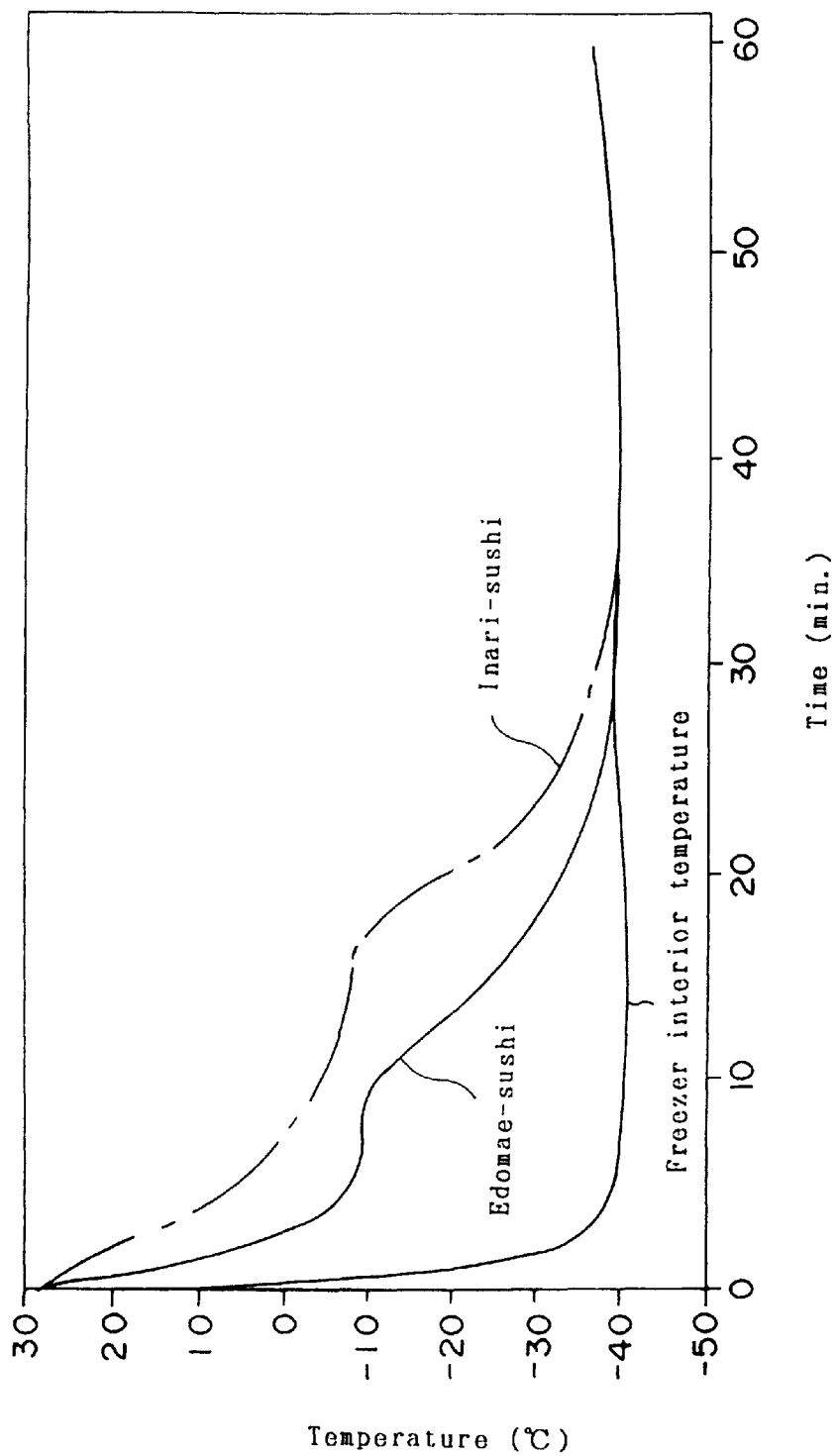
FIG. 3 is a diagram showing a freezing characteristic of inari-sushi and nigiri-sushi in Comparative Example 1 in a process of quick freezing.

FIG. 3 shows freezing characteristics of mixed inari-sushi and nigiri-sushi 1 in Comparative Example 1 (quick freezing). As shown in this Figure, as a freezer temperature control characteristic C, the freezer temperature was quickly reduced from a normal temperature, i.e., about 20° C., to about –40° C. in about 5 min. with an average temperature gradient of 6° C./min. and then held at –40° C. for a period of about 55 min. With this control characteristic C, a freezing curve of the temperature of the rice ball part of the nigiri-sushi 1 was produced such that, with the freezing started from normal temperature of 28° C., the temperature was reduced down to –10° C. by passing a maximum ice generation temperature range in an initial period of about 5 min. with a temperature gradient of about 4° C./min. The temperature was then held at that temperature for about 5 min., then reduced to about –40° C. in a subsequent period of about 20 to 30 min. and then held at that temperature for a subsequent period of about 30 min.

In the case of inari-sushi, a freezing curve of the temperature of the rice part was produced such that the temperature was reduced from 28° C. at the start of freezing to reach the maximum ice generation temperature range in the neighborhood of –1 to –5° C. in an initial period of about 7 to 10 min. The temperature was then held in the maximum ice generation temperature range for a subsequent period of about 10 min., then reduced to about –40° C. in a subsequent period of 10 to 20 min. and then held at that temperature for a subsequent period of about 30 min. Again, these freezing experiments were each carried out for 20 batches.

FIG. 4 shows a freezing characteristic of nigiri-sushi in Comparative Example 2 (slow freezing). As shown in this Figure, as a freezer temperature control characteristic D, the freezer temperature was reduced from a normal temperature of about 5° C. to about −12° C. in 5 min. with a linearly downward freezing temperature gradient. The temperature was then continually reduced slowly from −12° C. to about −30° C. in about 80 to 90 min. with an average temperature gradient of 0.2° C./min. With this control characteristic D, a freezing curve of the temperature of the rice ball part of the sushi was produced such that the temperature was reduced from the start of freezing to reach a maximum ice generation temperature range in the neighborhood of −1 to −5° C. in an initial period of about 25 min., then held in the maximum ice generation temperature range for a subsequent period of about 55 min. and then reduced to about −25° C. in a subsequent period of about 20 to 30 min. Again, this freezing experiment was carried out for 20 batches.

The frozen sushi, which was obtained in the above way, was covered at the top with a transparent lid and then sealed gas-tight in a vinyled bag at a temperature of 25° C. and under a reduced pressure of 500 mHg, followed by leaving it at normal temperature for about 120 to 180 min. for thawing. After this, the taste and sense of eating were examined together with the stickiness and hardness of rice. The results are shown in FIG. 5.

Figure 5:
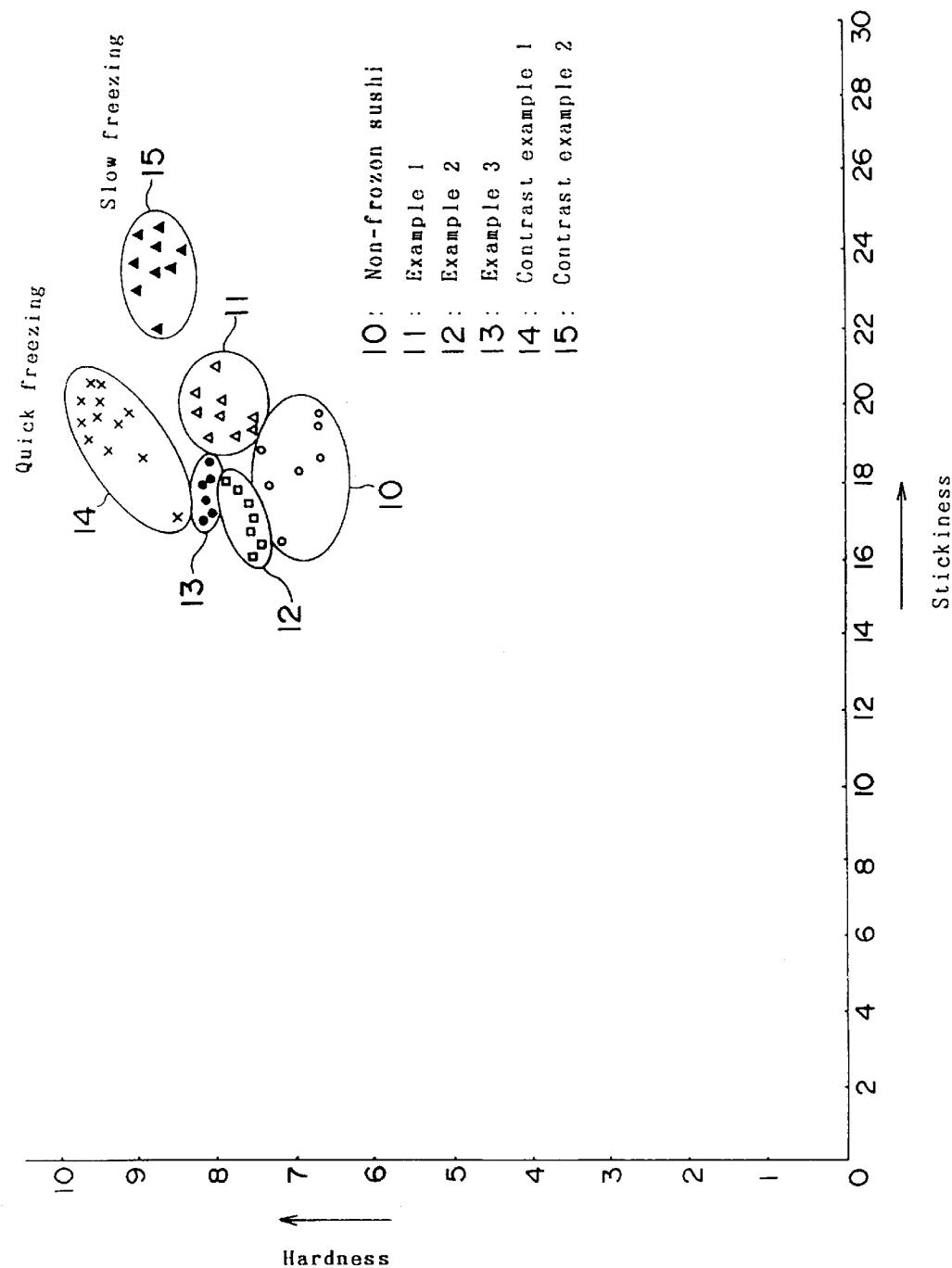
FIG. 5 is a graph showing distributions of measured hardness and stickiness of non-frozen sushi and frozen sushi in the above examples and comparative examples.

Referring to FIG. 5, group 10 represents characteristics of non-frozen sushi, group 11 represents characteristics of sushi frozen and thawed in Example 1, group 12 represents characteristics of sushi frozen and thawed in Example 2, group 13 represents characteristics of sushi using rice boiled with alkali water and frozen and thawed in Example 3, group 14 represents characteristics of sushi in Comparative Example 1 as a process of quick freezing and thawing, and group 15 represents characteristics of sushi frozen in Comparative Example 2 as a process of slow freezing and thawing. The characteristics of the sushi samples in Examples 1 to 3 are distributed around and not substantially different from the characteristics 10 of the non-frozen sushi. In addition, these sushi samples proved to have good taste and sense of eating when they were actually eaten.

However, the sushi sample with the characteristics of group 14 in Comparative Example 1 of quick freezing was high in hardness, and its taste and sense of eating were not desirable. The sushi sample with the characteristics of group 15 was not good at all when it was actually eaten, due to high value of hardness and low value of stickiness.

It is to be appreciated that, according to the invention, even when sushi or onigiri is frozen without a vinyl package for each piece of the food, by holding plural pieces of the sushi in rows in a vessel, it is possible to obtain substantially the same taste and sense of eating as non-frozen sushi or non-frozen onigiri. This means that the freezing operation can be extremely simplified. In addition, satisfactory quality can be obtained after natural thawing. This means that the frozen food can be directly held on a display table, which is very practical in supermarkets and convenience stores. Further, it is possible to provide sushi processing plants in foreign countries rather than near areas in which the sushi is to be consumed, which is very useful.

Now, a process of freezing and thawing boiled rice will be described with reference to FIG. 7.

First, 600 g of cleaned rice was washed by dipping it in about 1 liter of purified water, agitating it with the hands 15 times from the left and the same number of times from the right and then removing water. This washing was done 5 times repeatedly. Then, the washed rice was dipped in 840 milliliters of purified water for 120 min.

As soon as the dipping ended, the rice was boiled and steamed for a total period of 60 min. using a commercially available electric oven.

Then, a sample of the rice was left in a plastic mesh-like vessel for cooling down to 30° C.

Seven rice packs were then prepared by filling a plastic vessel (16 cm×11 cm×3 cm) like that for sushi with 200 g of sample. These rice packs were each preserved.

In the above way, 7 bags×3 ovens×6 ovens of packs were prepared.

Then, the packs were disposed on the second shelf of an exclusive food freezing unit (provided with a trade name "Plus α Freezer" manufactured by Maekawa Seisakusho) and then frozen such as to produce each of the freezing curves shown in FIGS. 8 to 13.

In this experiment, the commercially available "Plus a Freezer" was modified for use into a cassette rack type batch freezer, the inner temperature of which could be reduced down to −50° C., and through which air could flow slightly.

After freezing, each rice pack was packed by air-purged packing in a vinyl bag and then preserved overnight at −20 to −25° C. Then, it was thawed under the bad thawing condition of normal temperature (left alone at 25° C., room temperature) thawing for 180 to 240 min.

After thawing, analysis with a textulometer (a food physical characteristic measuring instrument manufactured by Zenken Co., Ltd.), water content rate analysis and sensuous taste testing were conducted.

The individual freezing and freezer temperature reduction processes will now be described.

Figure 8:
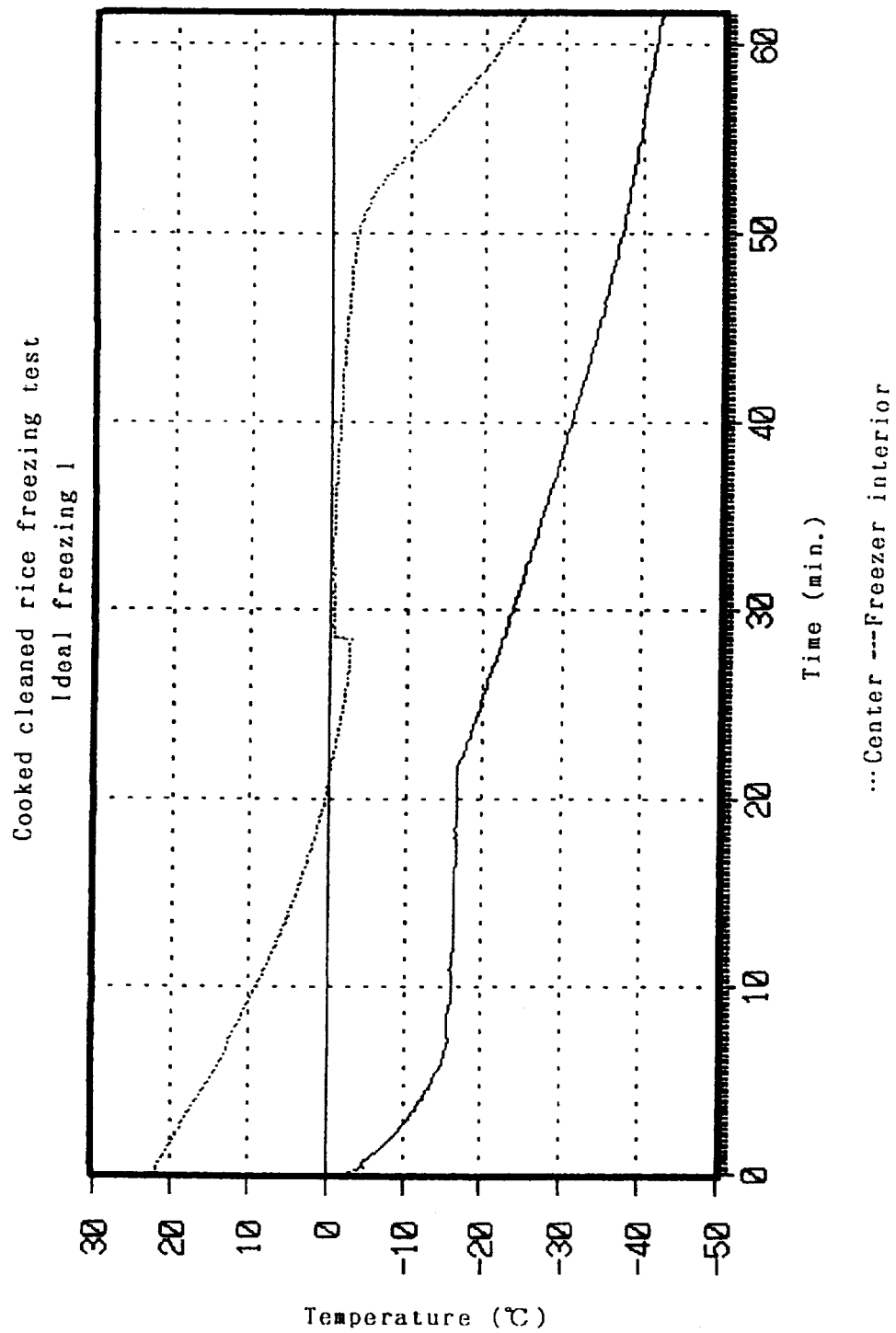
FIG. 8 is a diagram showing a freezing characteristic of boiled rice in Example 1 of the process according to the invention based on the flow shown in FIG. 7.
Figure 9:
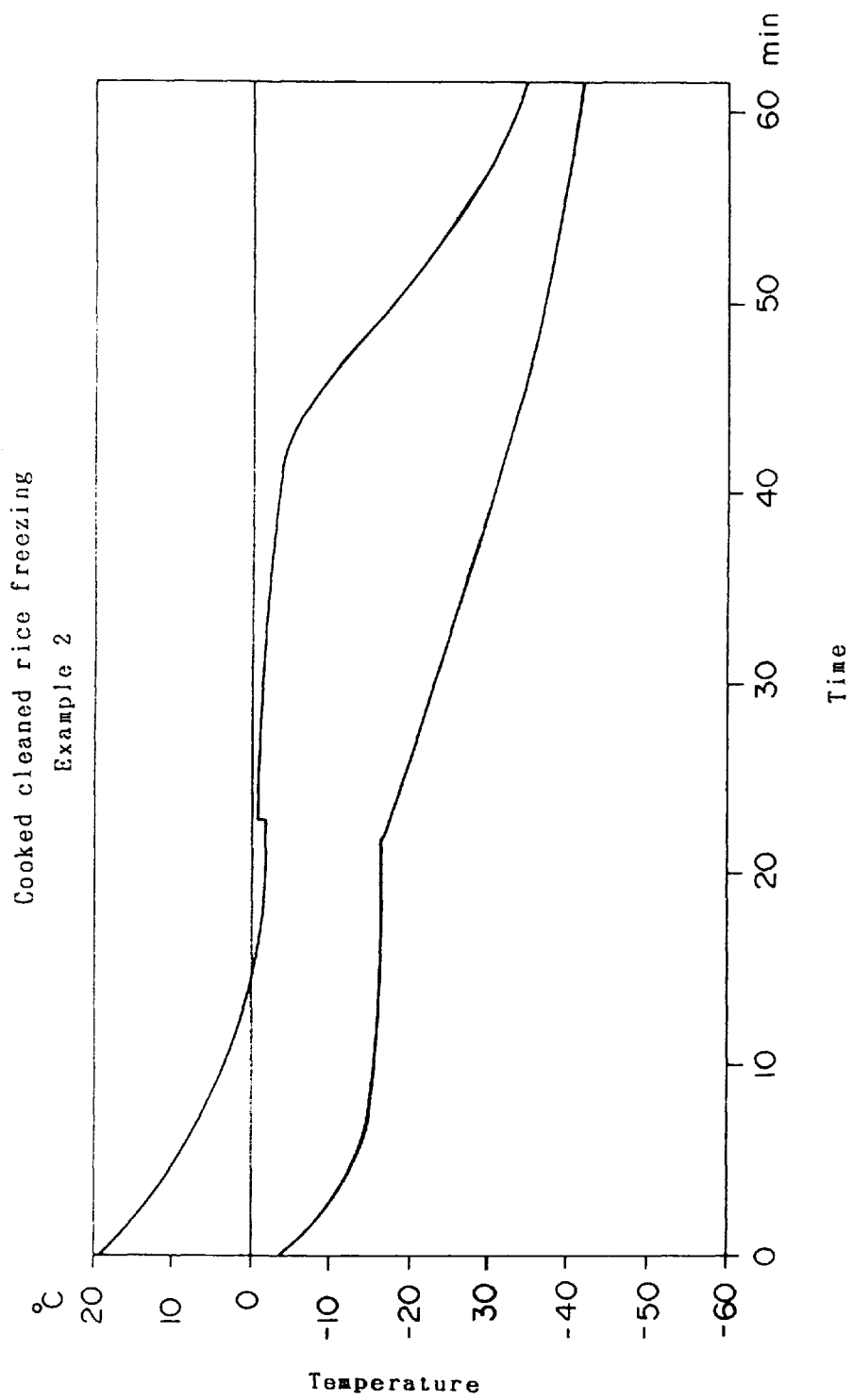
FIG. 9 is a diagram showing a freezing characteristic of boiled rice held in a vessel in Example 2 of the process according to the invention based on the flow shown in FIG. 7.
Figure 10:
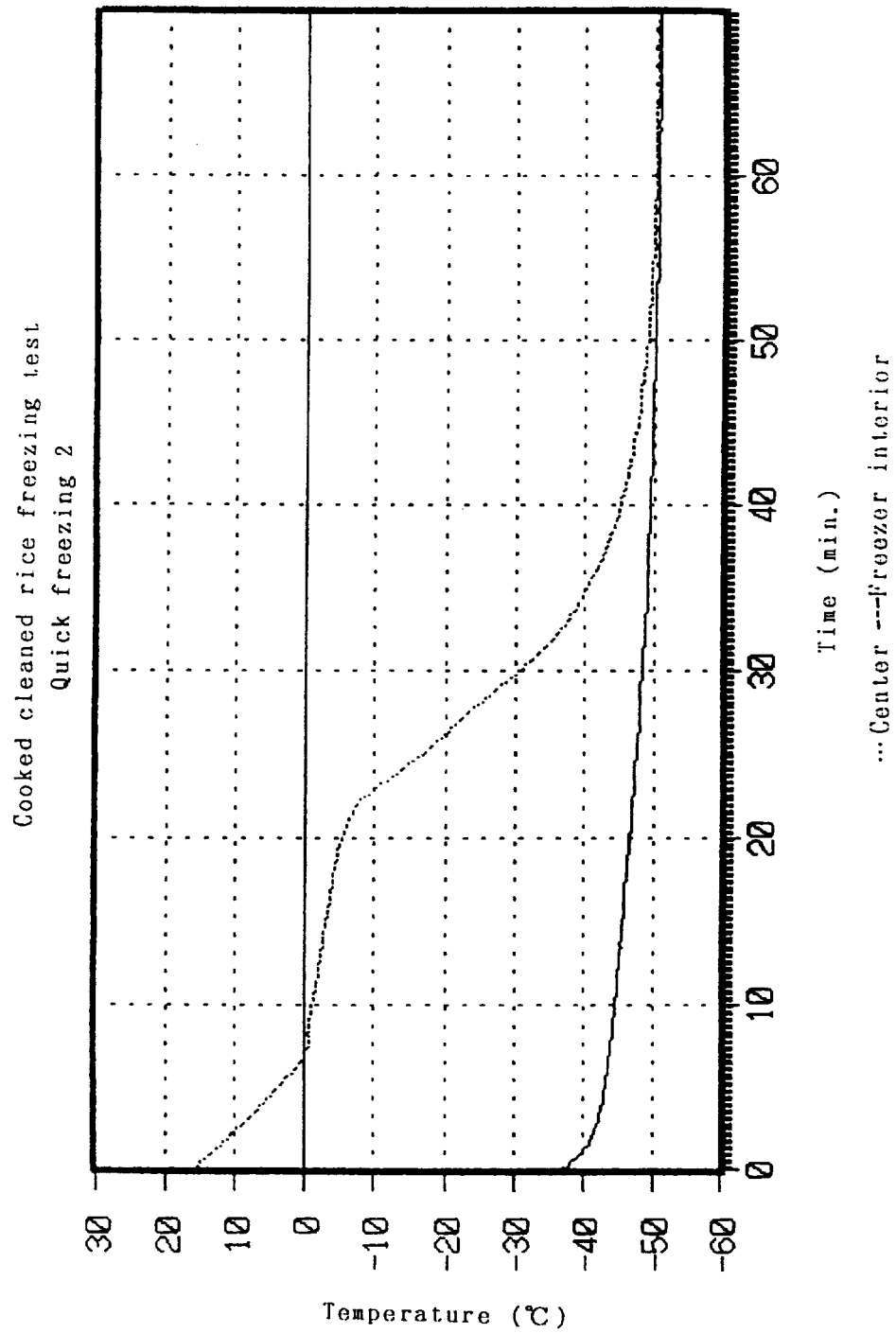
FIG. 10 is a diagram showing a freezing characteristic of boiled rice held in a vessel in a comparative example of quick freezing based on the flow shown in FIG. 7.
Figure 12:
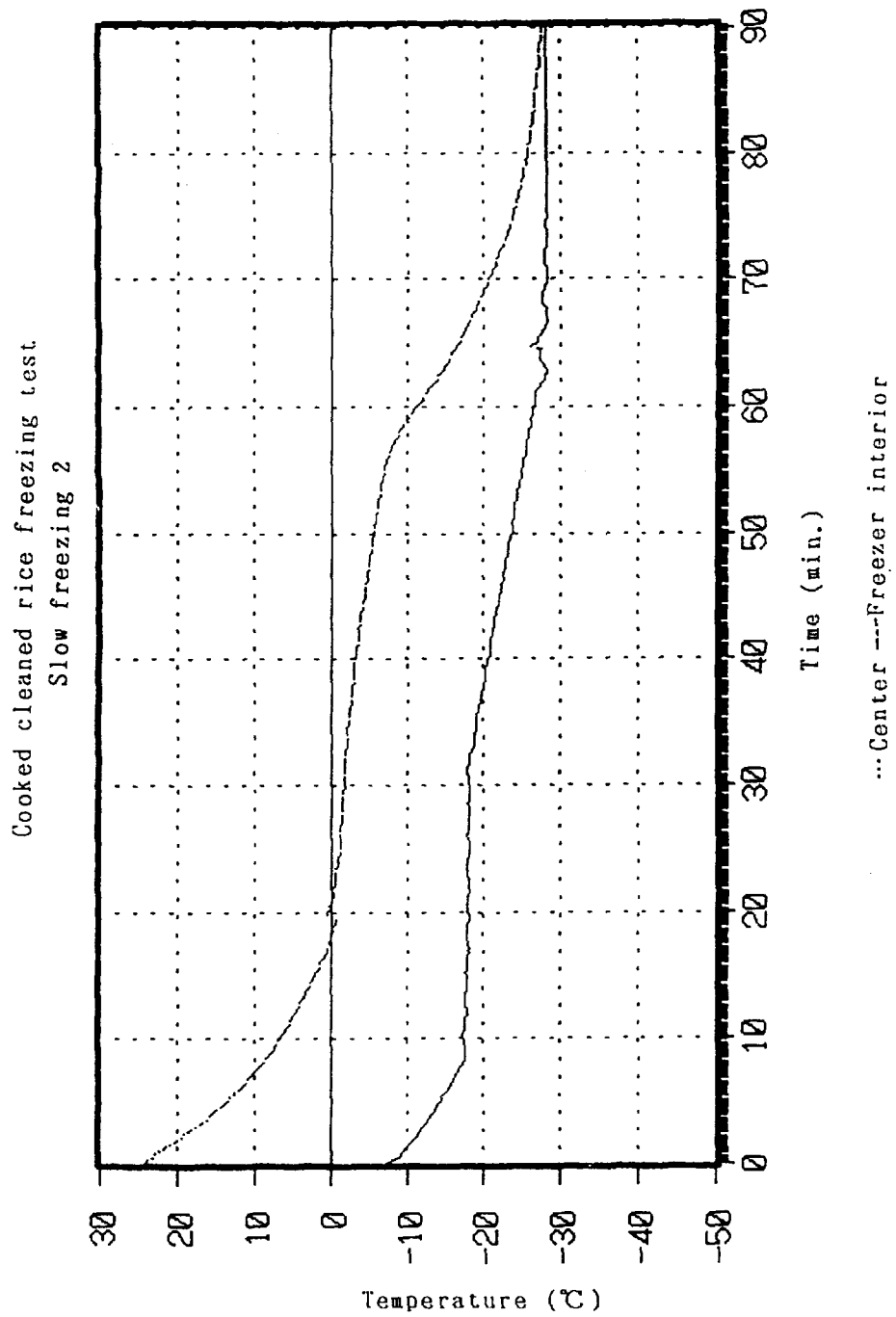
FIG. 12 is a diagram showing a freezing characteristic of boiled rice held in a vessel in a comparative example of slow freezing based on the flow shown in FIG. 7.
Figure 13:
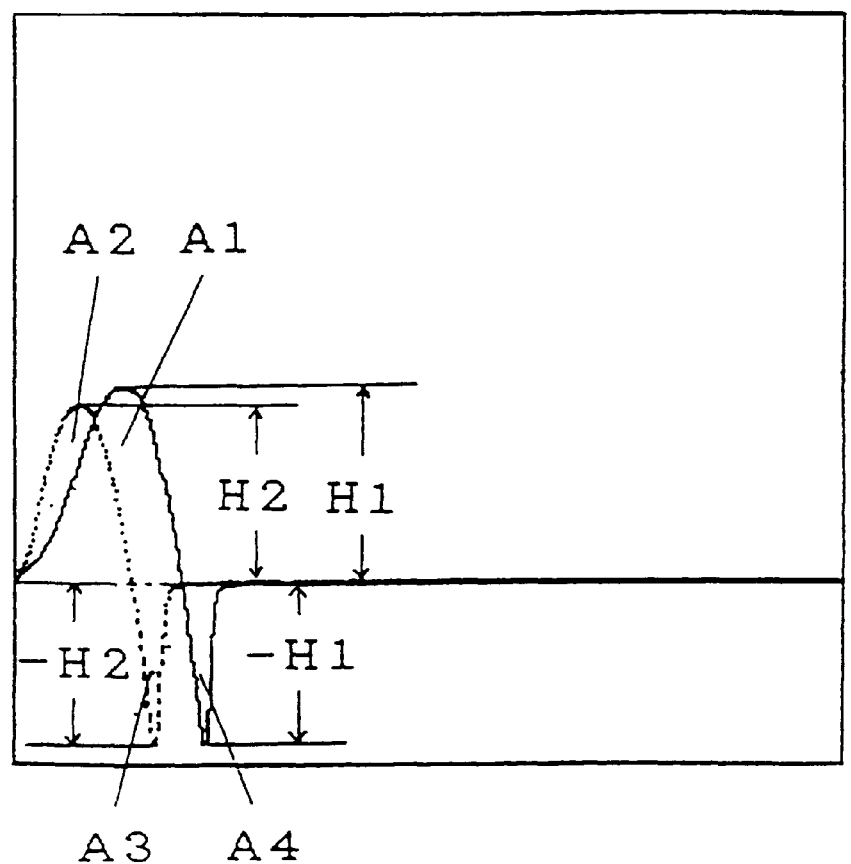
FIG. 13 is a wave form diagram showing a parameter sample obtained by analysis with a textulometer.

FIGS. 8 and 9 show a product temperature curve and a freezer temperature curve, respectively, in ideal freezing carried out with the above freezer in an embodiment of the invention. FIGS. 10 and 11 are a product temperature curve and a freezer temperature curve, respectively, of quick freezing carried out with the above freezer in a comparative example. FIGS. 12 and 13 are a product temperature curve and a freezer temperature curve, respectively, of slow freezing carried out with the above freezer in a comparative example.

Of the 7 packs noted above, 6 packs (2 packs as physical property analysis samples, one pack as a water content measurement sample, one pack as a taste testing sample, one pack as a temperature measurement sample and one pack as a spare (with less than 200 g of rice)) were subjected to freezing, while the remaining pack was used as contrast and not subjected to freezing.

The product temperature was measured using a "U Logger-L822-T" device (manufactured by Unipulse Inc.). More specifically, thermocouple terminals "TCT-G-0,32-2000" (manufactured by Unipulse Inc.) were buried in the four corners and center of the pack at a depth of about 1 cm from the boiled rice mass surface such that they were perfectly enclosed in the boiled rice mass. In this state, the temperature measurement was carried out. The results are shown in FIGS. 8 to 12.

Analysis with the textulometer after thawing was carried out by using a textulometer manufactured by Zenken Co., Ltd. More specifically, three boiled rice grains taken out randomly from the sample pack using a pair of tweezers were held in an analysis cell (or analysis dish), and an arm was brought into contact with the cell with its vertical movement. At this time, the boiled rice was squeezed by the arm, and an electric resistance that was offered when the arm was separated was used to calculate the hardness and stickiness.

Particularly with boiled rice, important parameters are, as shown in FIG. 13, hardness H (first chewing H1, second chewing H2), stickiness −H (first chewing −H1, second chewing −H2) and adhesion (A3, A4 (first and second chewing)).

Figure 14:
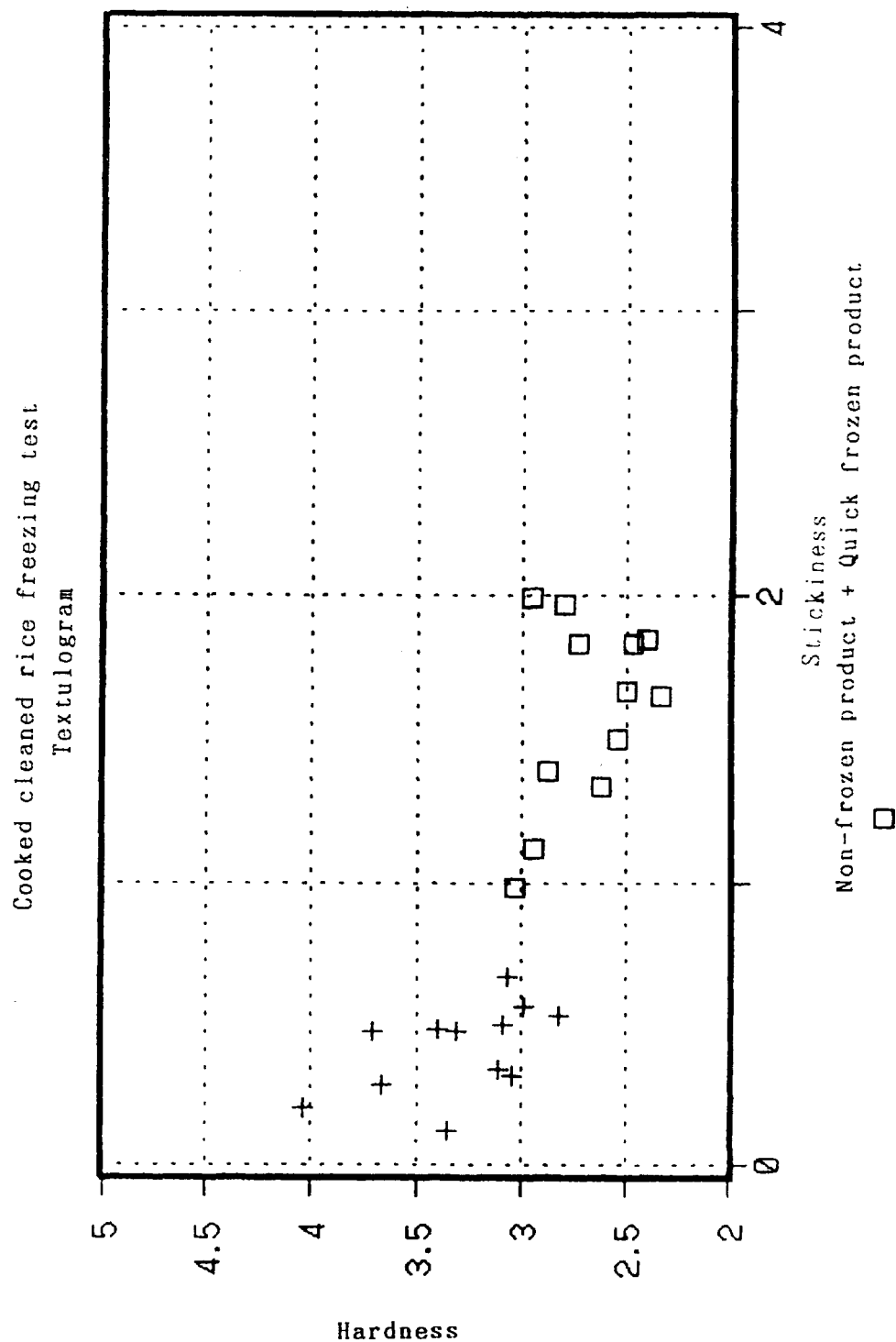
FIG. 14 is a diagram showing two-dimensional distributions of measured hardness and stickiness of non-frozen boiled rice and frozen boiled rice shown in FIG. 8.
Figure 15:
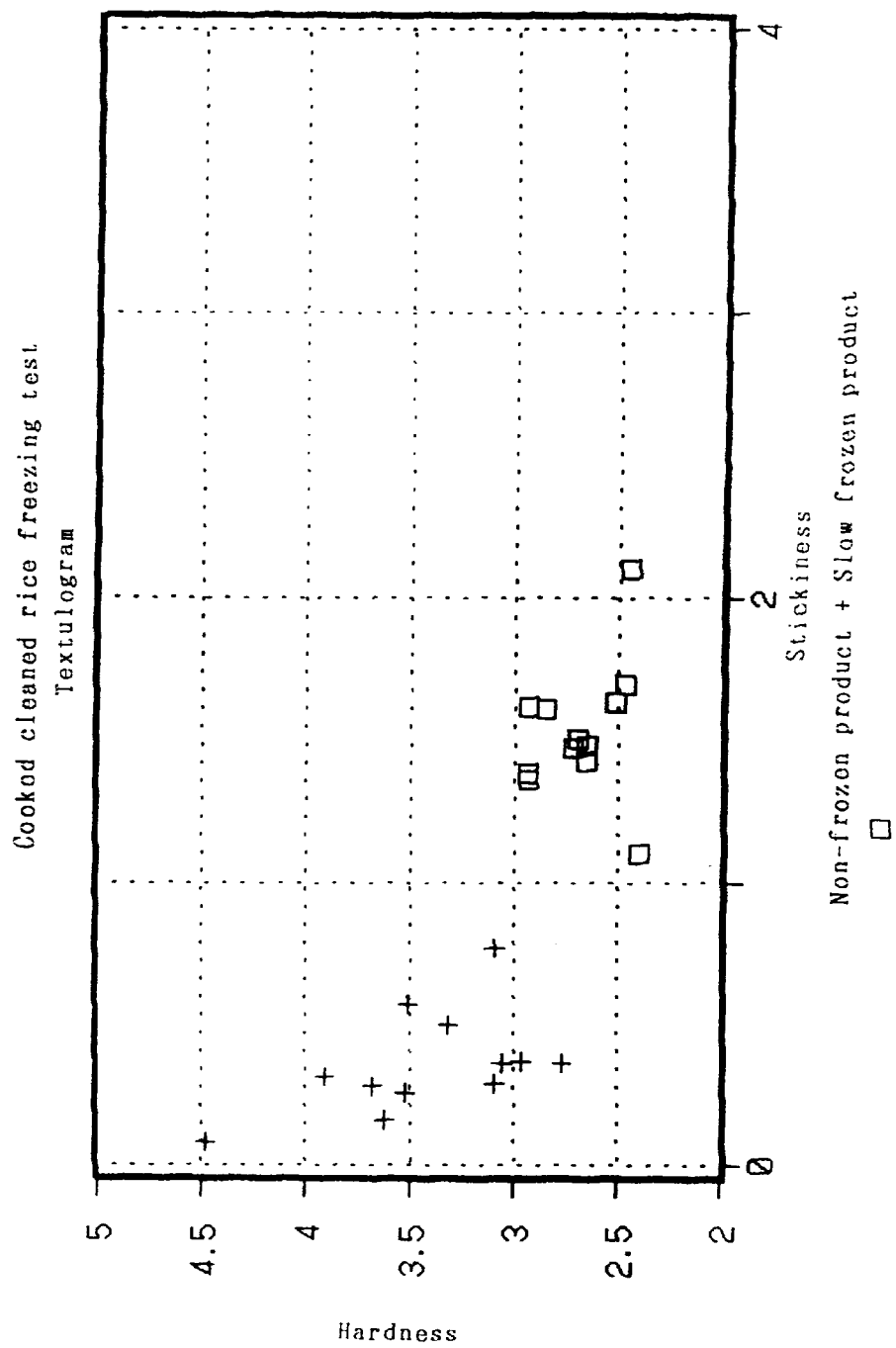
FIG. 15 is a diagram showing two-dimensional distributions of measured hardness and stickiness of non-frozen boiled rice and frozen boiled rice shown in FIG. 10.
Figure 16:
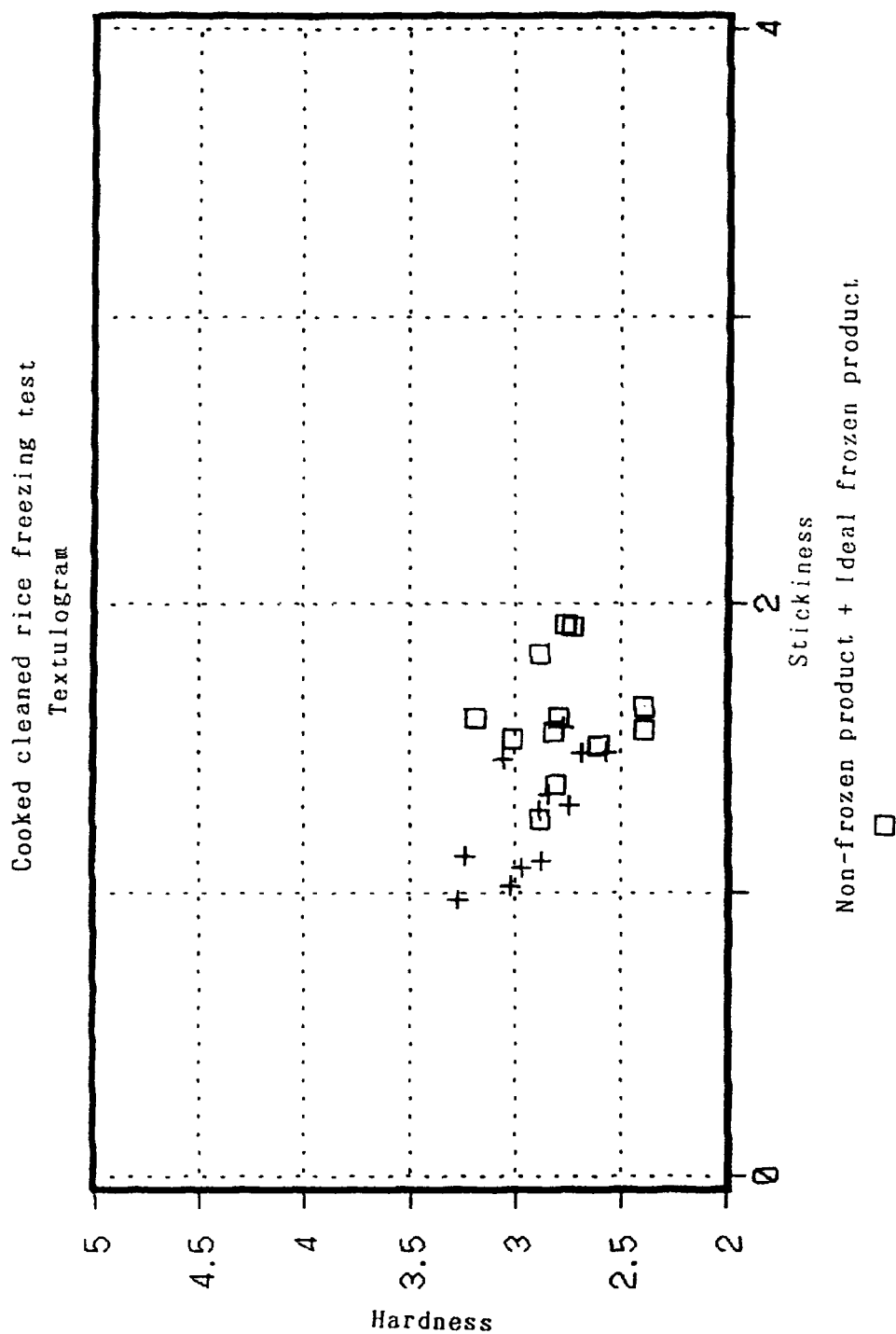
FIG. 16 is a diagram showing two-dimensional distributions of measured hardness and stickiness of non-frozen boiled rice and frozen boiled rice shown in FIG. 12.
Figure 18:
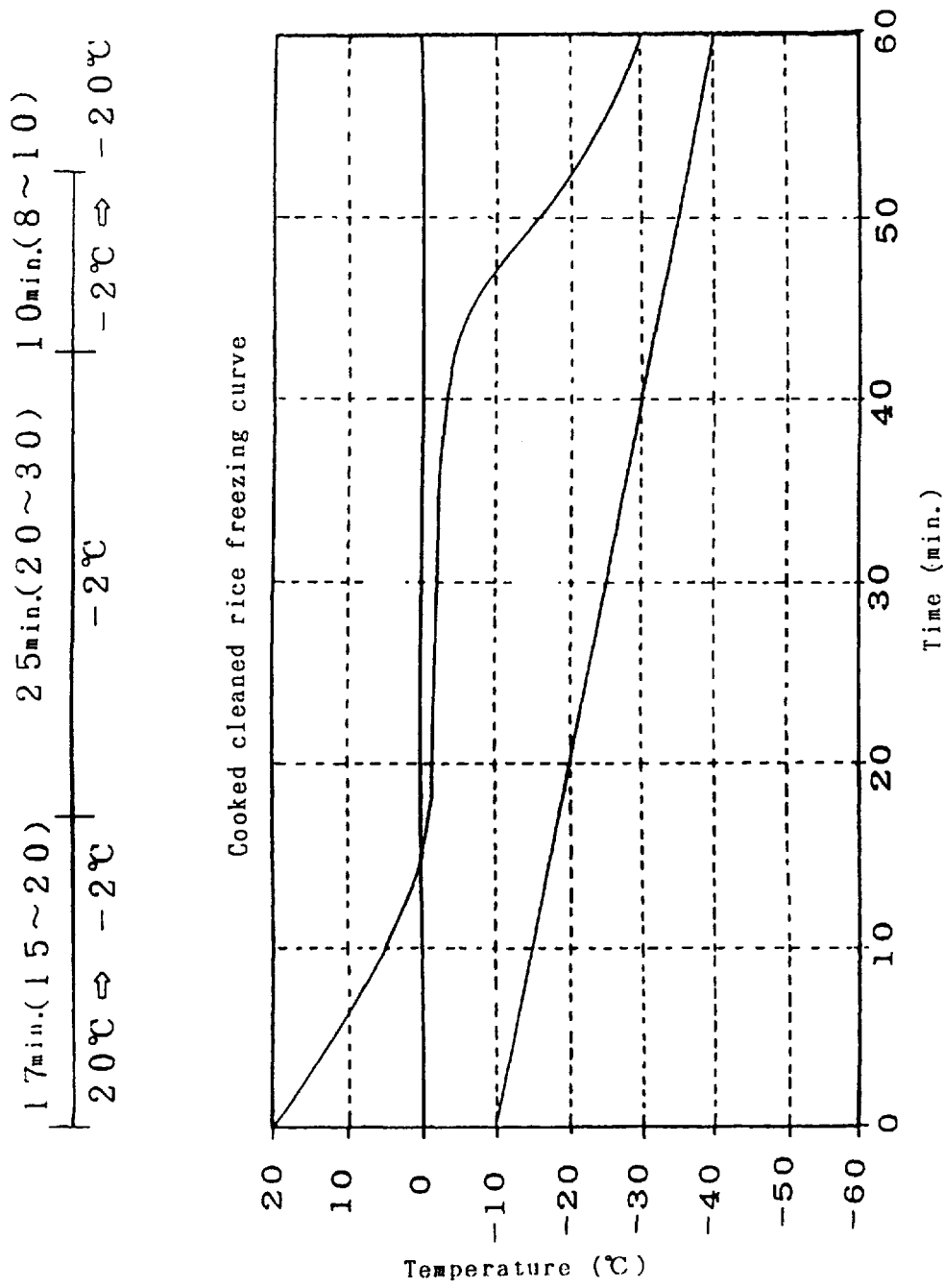
FIG. 18 is a diagram showing a freezing characteristic of boiled rice in Example 1 of the process according to the invention based on the flow shown in FIG. 7.
Figure 22:
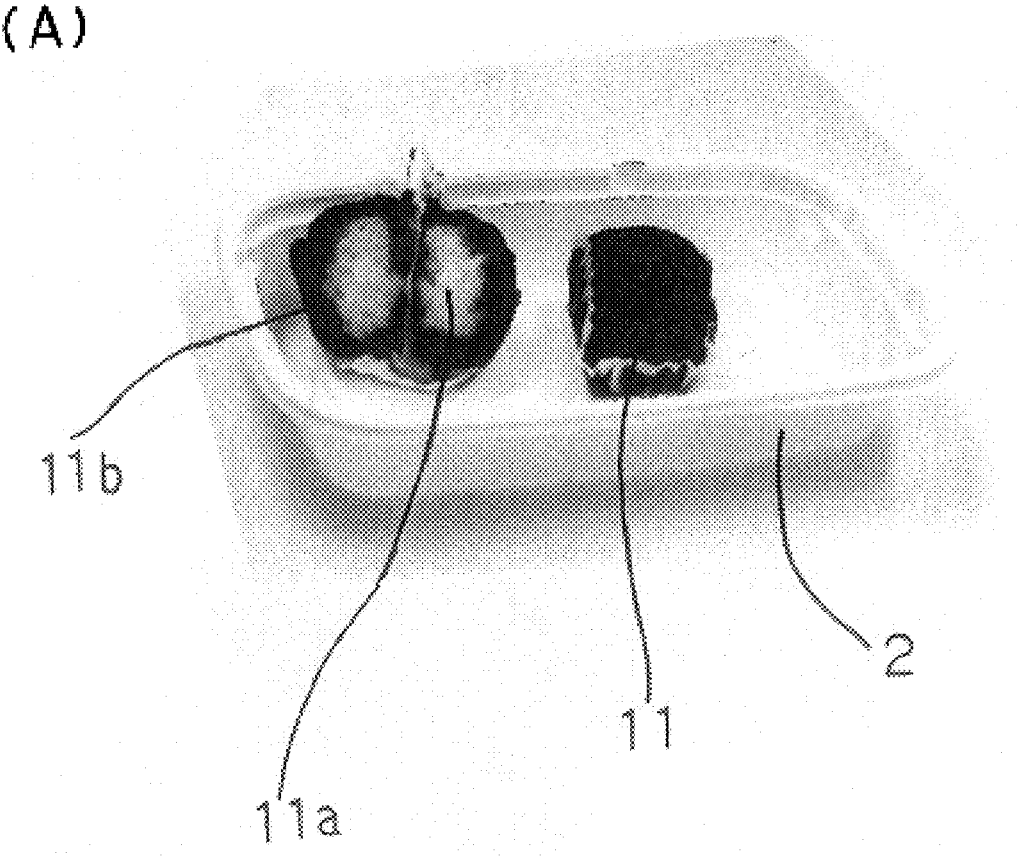

Of the products frozen and thawed on the basis of the individual freezing curves and non-frozen contrast product, two-dimensional graphs of the hardness H1 and stickiness −H1 were formed as shown in FIGS. 14 to 16.

As will be understood from these Figures, substantially the same hardness and stickiness as those of the non-frozen contrast product could be obtained only in the case of freezing on the basis of the ideal curve.

After thawing, the hardness, stickiness, taste and whiteness were evaluated by 5-mark evaluation on the basis of the standards of the Food Agency, the Ministry of Agriculture and Forestry of Japan. The 5-mark evaluation was made in comparison to the non-frozen contrast product (mark 5 representing the highest evaluation). The results are shown in FIG. 17.

As is obvious from the Figure showing evaluation examples, the taste and other characteristics of the products frozen and thawed on the basis of the ideal curve are good even when the products are thawed under the worst condition of natural thawing (at room temperature of 20 to 25° C.), that is, thawed at the glutinization temperature of starch or below.

Moreover, even when the products are left at room temperature of 20° C. for more than 7 hr. after the thawing, the taste deterioration is substantially the same as that of the non-frozen boiled rice or sushi and gives rise to no problems.

Further, in the case of quick thermal thawing at a temperature above the α/β transition point of starch with an electronic oven, hot air, hot water, etc., under good conditions, the taste can not be distinguished from that of rice which has just been boiled.

Further, since it is possible to maintain sufficient quality when the product is thawed by natural thawing, fluctuations of the thawing conditions on the shop side give rise to no problems.

The freezing processes shown in FIGS. 8 to 12 will now be described in detail.

In the case of FIG. 8, the freezer was first preliminarily cooled down to about −5° C.,a and then the temperature was reduced to about −15° C. in 7 min. with a temperature gradient of 1.5° C./min., then held at the temperature of −15° C. for 15 min. and then continually reduced to about −42° C. in 40 min. with a linear downward freezing temperature gradient of 0.7 to 0.8° C./min. With this control characteristic E, a freezing curve of the temperature of boiled rice was produced such that the temperature was reduced from normal temperature of 22° C. to reach a maximum ice generation temperature range of the neighborhood of 0 to −3° C. in an initial period of about 20 to 28 min with a temperature gradient of about 1.3° C., then held in the maximum ice generation temperature range for a subsequent period of about 25 to 30 min. and then reduced to about −25° C. in a subsequent period of about 10 to 15 min. with a temperature gradient of about 1.6° C./min.

In the case of FIG. 9, the freezer was first preliminarily cooled down to about −5° C., and then the temperature was reduced to about −15° C. in 7 min. with a temperature gradient of 1.2 to 1.5° C./min., then held at −15° C. for 15 min. and then continually reduced to about −42° C. in 40 min. with a linearly downward freezing temperature gradient of 0.7 to 0.8° C./min. With this control characteristic F, a freezing curve of the temperature of boiled rice was produced such that the temperature was reduced from a normal temperature of 20° C. to reach the maximum ice generation temperature range of the neighborhood of 0 to −3° C. in an initial period of about 20 to 25 min. with a temperature gradient of about 1.2° C., then held in the maximum ice generation temperature range for a subsequent period of about 20 to 25 min. and then reduced to about −20 to −25° C. in a subsequent period of 12 to 17 min. with a temperature gradient of about 1.5° C./min.

FIG. 10 shows a freezing characteristic in another comparative example (quick freezing 2). In this case, the freezer was first preliminarily cooled down to about −37° C., and then the temperature was gradually reduced to about −50° C. With this control characteristic H, the temperature of boiled rice was reduced from a normal temperature of 20° C. to reach the maximum ice generation temperature range of the neighborhood of 0 to −3° C. in an initial period of about 7 min. with a temperature gradient of about 2° C., then passed the maximum ice generation temperature range from 0∼−3° C. to −4∼−10° C. in a subsequent period of about 10 to 15 min. with a temperature gradient of 0.3° C., then reduced to −30° C. in a subsequent period of about 8 min. with a temperature gradient of about 3° C./min. and then gradually converged to −50° C.

FIG. 11 shows a freezing characteristic in a further comparative example (slow freezing). In this case, the freezer was first preliminarily cooled down to about −2° C., and then the temperature was reduced to about −7° C. in 3 min. with a temperature gradient of 2° C./min., then gradually reduced from −7° C. to −13° C. in 55 min. with a temperature gradient of about 0.1° C./min., and then reduced continually to about −30° C. in 40 min. with a linearly downward freezing temperature gradient of 0.4 to 0.5° C./min. With this control characteristic I, a freezing curve of the temperature of boiled rice was produced such that the temperature was reduced from a normal temperature of 20° C. to reach the maximum ice generation temperature range in the neighborhood of 0 to −3° C. in an initial period of about 20 to 25 min. with a temperature gradient of 1.2° C./min., then held in the maximum ice generation temperature range in a subsequent period of 35 to 45 min. and then reduced to about −20 to −25° C. in a subsequent period of about 30 min. with a temperature gradient of about 0.7° C./min.

FIG. 13 shows a freezing characteristic of another contrast example (slow freezing 2) based on the flow shown in FIG. 7. In this case, the freezer was first preliminarily cooled down to about −8° C., and then the temperature was reduced to about −18° C. in 8 min. with a temperature gradient of 1.2° C./min., then held at the temperature of −18° C. for 24 min., then gradually reduced to −28° C. in 30 min. with a temperature gradient of about 0.3° C./min., and then held at the temperature of −28° C. for 28 min. With this control characteristic J, a freezing curve of the temperature of boiled rice was produced such that the temperature was reduced from a normal temperature of 23° C. to the maximum ice generation temperature range of the neighborhood of 0 to −3° C. in an initial period of about 20 min. with a temperature gradient of 1.2° C., then reduced to pass the maximum ice generation temperature range in a subsequent period of about 38 min. with a slight temperature gradient of 0.2° C./min. and then reduced to about −28° C. in a subsequent period of about 30 to 35 min. with a temperature gradient of about 0.7° C./min.

In the case of FIG. 8, concerning an example of the invention, it is necessary to produce a freezer temperature curve, which takes about 8 min. for the first freezer temperature reduction step to reduce the freezer temperature down to about −15° C., and about 15 min. for the second freezer temperature reduction step to maintain the temperature of about −15° C., and about 35 to 40 min. for the third freezer temperature reduction step to reduce the freezer temperature to −42° C. with a substantially linear temperature gradient.

In the case of FIG. 9, it is necessary to produce a freezer temperature curve, which takes about 4 min. for the first freezer temperature reduction step to reduce the freezer temperature to about −8 to −10° C., and 15 to 17 min. for the second freezer temperature reduction step to reduce the freezer temperature gradually from about −8° C. to −15° C., and about 40 to 45 min. for the third freezer temperature reduction step to reduce the freezer temperature to about −37° C. with a substantially linear temperature gradient.

However, changing the freezer temperature in relation to time is unsuitable for continuous freezers, in which vessels are moved with conveyor trucks or pallets moved on a belt conveyor, although there is no problem in the case of batch processing.

In continuous freezing carried out by moving vessels on a net conveyor, as shown in FIG. 19, subsequent to cooling the freezer to about −10° C., a freezer temperature reduction step is provided to reduce the temperature from about −10° C. to −40° C. with a substantially linear temperature gradient of 0.5 C/min.

With this control characteristic K, a freezing curve of the temperature of boiled rice was produced such that the temperature was reduced from normal temperature of 23° C. to reach a maximum ice generation temperature range in the neighborhood of 0 to −3° C. in an initial period of about 20 min. with a temperature gradient of about 1.2° C./min., then caused to pass the maximum ice generation temperature range in a subsequent period of 38 min. with a slight temperature gradient of about 0.2 to 0.5° C./min and then reduced to about −28° C. in a subsequent period of about 30 to 35 min. with a temperature gradient of about 0.5 to 1° C./min., preferably 0.7 C/min.

While the invention has been described in connection with boiled rice alone, it will be readily understood that substantially the same taste and sense of eating as those of non-frozen boiled rice are obtainable with processed food with boiled rice as main component, such as onigiri or chirashi. Further, while boiled rice, curry rice, okowa, etc., which are to be eaten in a hot state, may be thawed using an electronic oven, chirashi, onigiri, etc. to be eaten in a cold state, may be thawed without use of any electronic range or the like. Natural thawing can instead be used to obtain substantially the same taste and sense of eating as those of non-frozen food. Thus, the invention is very beneficial.

It is to be appreciated that, according to the invention, it is only necessary to preserve, for instance, a large amount of factory-boiled rice by freezing in packed vessels or processed into sushi or the like for providing tasty boiled rice, onigiri, sushi, etc. when desired and in necessary amounts. Thus, there is no need for a 24-hour rice boiling system, and it is possible to improve inefficient production of small amounts of various kinds of food. Further, since the food can be preserved, it is possible to eliminate discarding loss, even when the consumption is low.

Further, plants for processing-boiled rice into processed food products may be installed in foreign countries rather than new consumption areas. Thus, the invention is very beneficial.

What is claimed is:

1. A process of freezing a group of sushi, in which at least one of nigiri-sushi, maki-sushi, and inari-sushi is frozen, said process comprising:

placing the group of sushi on a vessel, and disposing the vessel in a freezer and freezing the group of sushi, the freezing comprising:

a first freezing step in which the group of sushi placed on said vessel is disposed in the freezer, and the temperature of a rice ball part of the sushi is reduced from an initial temperature to a freezing point in a range of 0° C. to −4° C.;

a second freezing step in which the temperature is reduced to a temperature in the range from the freezing point to −10° C. and maintained at this temperature for a predetermined period of time until passing of a maximum ice generation temperature range, and a third freezing step in which the temperature is reduced to −15° C. or below after the passing of the maximum ice generation temperature range;

the first freezing step having a temperature gradient which is set to be greater than the said second freezing step, and said second freezing step being carried out for a time which is set to be longer than the first freezing step.

2. The process according to claim 1, wherein in said third freezing step the temperature is reduced to −20° C. or below.

3. The process according to claim 2, wherein in said third freezing step the temperature is reduced to −30° C. or below.

4. The process according to claim 1, wherein the time of said second freezing step is set to about 13 to 35 min.

5. The process according to claim 1, wherein the third freezing step reduces the temperature to from −20 to −30° C. after the passing of the maximum ice generation temperature range and has a temperature gradient which is at least equal to the temperature gradient of the first freezing step.

6. The process according to claim 1, wherein the temperature gradient in said first freezing step is set to about 1 to 2.5° C./min., the temperature gradient in the second freezing step is set to at most about 0.5° C./min., and the temperature gradient in said third freezing step is set to about 1 to 3° C./min.

7. The process according to claim 6, wherein the temperature gradient in the first freezing step is about 1 to 2° C./min., the temperature gradient in the second freezing step is at most 0.3° C./min., and the temperature gradient in the third freezing step is about 1.5 to 2.5° C./min.

8. The process according to claim 1, wherein the third freezing step is carried out over a time of at least about 10 minutes until a temperature of −30° C. is reached.

9. The process according to claim 8, wherein the third freezing step is carried out for a time from 10 to 20 minutes.

10. The process according to claim 1, wherein the sushi is disposed in vessels in the freezer with a plurality of sushi pieces held in rows in each vessel, and the freezer then is preliminarily cooled down to about 0 to −15° C. and freezing is started, the freezing comprising a first temperature reduction step in which the temperature of the freezer is reduced from the preliminary cooling temperature to about −30° C.

in about 5 to 25 minutes from the start of freezing of the sushi, and a subsequent second temperature reduction step to a temperature lower than −30° C., the temperature gradient in the first temperature reduction step being greater than the temperature gradient in the second temperature reduction step, and the time until passing of the maximum ice generation temperature range of 0 to −10° C. of the rice part of the sushi being set to 15 to 35 min.

11. The process according to claim 10, wherein the freezer is preliminarily cooled to from −5 to −10° C., and the time until passing of the maximum ice generation temperature range of 0 to −10° C. is from 15 to 25 min.

12. The process according to claim 10, wherein the temperature gradient in the second temperature reduction step is at most 1° C./min.

13. The process according to claim 12, wherein the temperature gradient in the second temperature reduction step is from about 0.2 to 0.5° C./minute.

14. The process according to claim 10, wherein the nigiri-sushi or the maki-sushi is frozen, and after the preliminary cooling down of the freezer, the sushi is disposed in the freezer in vessels with a plurality of sushi pieces held in rows in each vessel, and freezing is then started, the freezing comprising a first temperature reduction step in which the freezer temperature is reduced from the preliminary cooling temperature to about −30° C. in about 15 to 25 minutes, and a subsequent second temperature reduction step in which the freezer temperature is reduced to a temperature below −30° C., the first temperature reduction step having a temperature gradient greater than the second temperature reduction step, and the time until passing of the maximum ice generation temperature range of 0 to −10° C. of a rice part of the sushi being set to 15 to 25 minutes.

15. The process according to claim 14, wherein the maximum ice generation temperature range is from −3 to −6° C., and the time until passing of the maximum ice generation temperature range is from 15 to 20 min.

16. The process according to claim 10, wherein the nigiri-sushi or the maki-sushi at room temperature is frozen, the temperature gradient in the first temperature reduction step of reducing the freezer temperature from the preliminary cooling temperature of −10 to −30° C. is set to about 1 to 2° C./minute and the time of the first temperature reduction step is about 20 minutes, and the temperature gradient in the second temperature reduction step of reducing the freezer temperature to below −30° C. is at most 1° C./minute.

17. The process according to claim 16, wherein in the second temperature reduction step the freezer temperature is reduced to a temperature of −40° C. or below, and the temperature gradient in the second temperature reduction step is about 0.5° C./minute.

18. The process according to claim 10, wherein the freezing is carried out such that the temperature gradient in the first freezing step is about 2° C./minute, the temperature gradient in the second freezing step is at most about 0.5° C./minute, and the temperature gradient in the third freezing step is at most about 2° C./minute.

19. The process according to claim 18, wherein the temperature gradient in the second freezing step is at most about 0.3° C./min.

20. The process according to claim 1, wherein the inari-sushi is frozen, and after the preliminary cooling down of the freezer, the sushi is disposed in the freezer in vessels with a plurality of sushi pieces held in rows in each vessel, and freezing is then started, the freezing comprising a first temperature reduction step in which the freezer temperature is reduced from the preliminary cooling temperature to about −30° C. in about 5 to 15 minutes at a temperature gradient of about 2° C./minute, and a second temperature reduction step in which the freezer temperature is reduced to −45° C. at a temperature gradient of 0.2 to 0.5° C./minute.

21. The process according to claim 1, wherein the inari-sushi is frozen such that the temperature gradient in the first freezing step is about 1.2 to 1.5° C./minute and the time of the first freezing step is from 10 to 20 minutes, the temperature gradient in the second freezing step is at most about 0.3° C./minute and the time of the second freezing step is about 25 to 35 minutes, and the temperature gradient in the third freezing step is about 2° C./min.

22. A process of freezing a group of sushi, in which at least one of nigiri-sushi, maki-sushi, and inari-sushi is frozen, said process comprising:

placing the group of sushi on a vessel, and disposing said vessel in a freezer and freezing the group of sushi, the freezing comprising:

a first freezing step in which the group of sushi placed on said vessel is disposed in the freezer, and a freezer temperature is reduced from an initial temperature at the start of freezing to a freezing point of boiled rice, a second freezing step in which the temperature is reduced from said freezing point to a maximum ice generation temperature for boiled rice and maintained at said maximum ice generation temperature for a predetermined period of time, said maximum ice generation temperature lying in the range from −4 to −10° C., and a third freezing step in which the freezer temperature, after passing the maximum ice generation temperature range, is reduced to at most −20° C., the first freezing step having a temperature gradient greater than the second freezing step, and the time until passing the maximum ice generation temperature range of boiled rice being from 15 to 35 minutes.

23. The process according to claim 22, wherein the sushi is disposed in the freezer in an enclosed state.

24. The process according to claim 22, wherein said freezing point lies in the range from about 0 to −4° C.

25. The process according to claim 22, wherein in the third freezing stage the temperature is reduced to at most −30° C.

26. The process according to claim 22, wherein the time until passing the maximum ice generation temperature range is from 15 to 30 minutes.

27. The process according to claim 26, wherein the time until passing the maximum ice generation range is from 20 to 30 minutes.

28. The process according to claim 22, wherein the sushi is frozen from room temperature, the temperature gradient in the first freezing step is from 1.5 to 2.5° C./minute and the time of the first freezing step is from 15 to 25 minutes, the temperature gradient in the second freezing step is at most about 0.5° C./minute through the maximum ice generation temperature range and the time in the second freezing step is about 23 to 37 minutes, the temperature gradient in the third freezing step is about 1 to 2.5° C./minute and the freezer temperature is reduced in the third freezing step to a temperature in the range from −20 to −30° C.

29. The process according to claim 28, wherein the temperature gradient in the first freezing step is about 2° C./minute, the time of the first freezing step is about 20 minutes, the maximum ice generation temperature range is from −4 to −10° C., the temperature gradient in the second freezing step is at most about 0.3° C./minute, and the temperature gradient in the third freezing step is 1.5 to 2° C./minute.

30. The process according to claim 22, wherein after the maximum ice generation temperature range has been passed, the time in the third freezing step until a temperature of −30° C. is reached is at least about 10 minutes.

31. The process according to claim 30, wherein the time in the third freezing step until a temperature of −30° C. is reached is from 10 to 20 minutes.

32. A process of freezing boiled rice or processed foods consisting mainly of boiled rice, remaining in a wrapped condition, and disposed in a freezer, comprising preliminarily cooling down a freezer to from 0 to −10° C. and then placing wrapped, clustered boiled rice in the freezer, the freezing comprising:

a first freezing step of reducing the freezer temperature at a temperature gradient of about 1 to 3° C./minute for about 10 to 20 minutes to a temperature of about −10 to −20° C., a second freezing step of maintaining the temperature in the range from about −10 to −20° C. for a time of from 10 to 23 minutes, and a third freezing step of reducing the freezer temperature at a substantially linear temperature gradient of 0.5 to 1.5° C./minute from the temperature of the second step to −30 to −45° C.

33. The process according to claim 32, wherein the wrapped, clustered boiled rice is disposed in the freezer in a wrapped vessel.

34. The process according to claim 32, wherein the temperature gradient in the first step is 1 to 2° C./minute, the temperature is reduced in the first step to about −15° C., the second step is carried out for a time of from 10 to 20 minutes, and the temperature gradient in the third step is 0.5 to 1° C./minute.

35. The process according to claim 34, wherein the second step is carried out for about 15 minutes.

* * * * *